(12) United States Patent
Fan et al.

(10) Patent No.: US 11,234,131 B2
(45) Date of Patent: Jan. 25, 2022

(54) INFORMATION VERIFICATION METHOD AND RELATED DEVICE

(71) Applicant: HUAWEI TECHNOLOGIES CO., LTD., Shenzhen (CN)

(72) Inventors: Shunan Fan, Beijing (CN); Shuiping Long, Beijing (CN); Linyi Gao, Berkshire (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/638,507

(22) PCT Filed: Aug. 28, 2017

(86) PCT No.: PCT/CN2017/099267
§ 371 (c)(1),
(2) Date: Feb. 12, 2020

(87) PCT Pub. No.: WO2019/041086
PCT Pub. Date: Mar. 7, 2019

(65) Prior Publication Data
US 2020/0374694 A1 Nov. 26, 2020

(51) Int. Cl.
*H04W 12/30* (2021.01)
*H04W 8/20* (2009.01)
(Continued)

(52) U.S. Cl.
CPC .......... *H04W 12/35* (2021.01); *H04W 8/205* (2013.01); *H04W 12/06* (2013.01); *H04W 12/126* (2021.01); *H04W 12/72* (2021.01)

(58) Field of Classification Search
None
See application file for complete search history.

(56) References Cited

U.S. PATENT DOCUMENTS

| 9,426,731 B1 | 8/2016 | Uy et al. |
| 2010/0228973 A1 | 9/2010 | Dancer et al. |

(Continued)

FOREIGN PATENT DOCUMENTS

| CN | 101141253 A | 3/2008 |
| CN | 101277297 A | 10/2008 |

(Continued)

OTHER PUBLICATIONS

GSMA, "RSP Technical Specification", Version 3.0, Draft 2, Jun. 21, 2017, total 308 pages.

*Primary Examiner* — German Viana Di Prisco
(74) *Attorney, Agent, or Firm* — Maier & Maier PLLC

(57) ABSTRACT

An information verification method and a related device. The method includes: receiving, by a first profile server, a remote profile management request sent by a remote profile management server, where the remote profile management request includes a first profile owner identifier; obtaining a second profile owner identifier in profile information; determining whether the first profile owner identifier is the same as the second profile owner identifier; and sending a remote profile management command to user equipment when the first profile owner identifier is the same as the second profile owner identifier. In this way, a loss caused to an operator or a profile owner due to a user's access to an invalid network or random profile unlocking is avoided, network security is improved, and waste of network resources is reduced.

19 Claims, 10 Drawing Sheets

(51) Int. Cl.
*H04W 12/06* (2021.01)
*H04W 12/72* (2021.01)
*H04W 12/126* (2021.01)

(56) References Cited

U.S. PATENT DOCUMENTS

| | | |
|---|---|---|
| 2014/0329502 A1 | 11/2014 | Lee et al. |
| 2016/0063260 A1 | 3/2016 | Sharp et al. |
| 2016/0142906 A1* | 5/2016 | Park .................. H04W 4/50 455/419 |
| 2016/0157085 A1* | 6/2016 | Yeoum ............... H04M 3/387 455/435.1 |
| 2016/0173493 A1 | 6/2016 | Wane |
| 2016/0330624 A1 | 11/2016 | Lee |
| 2017/0338944 A1* | 11/2017 | Yang .................. H04L 9/3297 |
| 2018/0041601 A1* | 2/2018 | Park .................. H04L 9/0891 |
| 2018/0123803 A1 | 5/2018 | Park et al. |
| 2018/0294949 A1* | 10/2018 | Yang .................. H04W 12/42 |
| 2018/0295500 A1* | 10/2018 | Yang .................. H04W 8/183 |
| 2019/0058989 A1* | 2/2019 | Park .................. H04W 8/20 |
| 2019/0074983 A1* | 3/2019 | Yang .................. H04L 9/3265 |
| 2019/0208405 A1* | 7/2019 | Park .................. H04W 12/45 |

FOREIGN PATENT DOCUMENTS

| | | |
|---|---|---|
| CN | 101389060 A | 3/2009 |
| CN | 103546886 A | 1/2014 |
| CN | 103731823 A | 4/2014 |
| CN | 104813634 A | 7/2015 |
| CN | 105792178 A | 7/2016 |
| CN | 105956423 A | 9/2016 |
| CN | 106535168 A | 3/2017 |
| CN | 107005837 A | 8/2017 |
| EP | 2180608 A1 | 4/2010 |
| EP | 2854432 A2 | 4/2015 |
| EP | 3073770 A1 | 9/2016 |
| WO | 2015081545 A1 | 6/2015 |
| WO | 2016/167551 A1 | 10/2016 |
| WO | 2017061800 A1 | 4/2017 |

* cited by examiner

INFORMATION VERIFICATION METHOD AND RELATED DEVICE

CROSS-REFERENCE TO RELATED APPLICATIONS

This application is a National Stage of International Patent Application No. PCT/CN2017/099267 filed on Aug. 28, 2017, which is hereby incorporated by reference in its entirety.

TECHNICAL FIELD

Embodiments relate to the field of wireless network technologies, and in particular, to an information verification method and a related device.

BACKGROUND

Currently, a user may purchase a subscriber identity module (SIM) from a communications operator, to obtain a number resource of the operator, so as to be entitled to use a communications service provided by the operator. As technologies and requirements evolve, an embedded universal integrated circuit card (eUICC), also referred to as an embedded SIM (eSIM), emerges. The eUICC is a newly defined secure element that is used by a plurality of communications operators to remotely manage a subscriber, and is placed into a terminal in a plug-in manner or a welding manner. A user may select an operator network for user equipment (UE) of the user, and download a profile from the operator network. After the profile is downloaded to the eUICC, the user equipment may access the selected operator network by using data provided in the profile. In addition, the user may alternatively select another operator, and download a profile of the another operator to implement a scenario such as a handover between the operator networks. Because internet of things exists in different industries, it is relatively convenient to provide an eUICC for a device in the internet of things, so that the device accesses and uses the network. For example, it is more convenient for a device such as a smart meter or a smart in-vehicle system to use an eUICC to be connected to and authenticated by the network and to use the network. Many international and national standard organizations are formulating related standards for an eUICC, mainly including Global System for Mobile Communications Association (GSMA) and European Telecommunications Standards Institute (ETSI).

In an existing eUICC architecture, the following function definitions are provided: An integrated circuit card identifier (ICCID) is also referred to as a profile ID, and is used to uniquely identify a profile. An eUICC identifier (EID) is used to uniquely identify an eUICC. A profile is a set of file structures, data, applications, and the like, and includes one or more network access applications and corresponding network access credentials, for example, an international mobile subscriber identity and a personal key identity ( ). A subscription manager-data preparing (SM-DP, or Subscription Manager Data Preparation+ (SM-DP+)) server is also referred to as a profile provisioner or a profile download server, and may create, generate, manage, or transmit a profile based on basic subscription information, such as an international mobile subscriber identity (IMSI), provided by a mobile network operator (MNO). After a profile is downloaded to an eUICC, an MNO may send a remote profile management (RPM) command to manage the downloaded profile, for example, perform operations such as activating, deactivating, deleting, and enumerating an installed profile list and updating a profile-related parameter. However, only a profile owner (PO) has permission to manage the downloaded profile, and whether the MNO is an owner of the profile is not verified. Consequently, a network security problem easily occurs in a network profile management process.

SUMMARY

An information verification method and a related device, to resolve a network security problem is described with possible embodiments.

According to a first aspect, an embodiment provides an information verification method, including: first receiving, by a first profile server, a remote profile management request sent by a remote profile management server, and obtaining a second profile owner identifier in profile information; then determining whether a first profile owner identifier is the same as the second profile owner identifier; and sending, by the first profile server, a remote profile management command to user equipment when the first profile owner identifier is the same as the second profile owner identifier. This prevents a third party from maliciously tampering with profile information that is not possessed by the third party, and avoids a loss caused to an operator or a profile owner due to a user's access to an invalid network or random profile unlocking. In addition, the profile server verifies a PO on a network side. In this way, network security can be improved, a bidirectional authentication process between the profile server and a terminal can be reduced, and a waste of network resources can be reduced.

In an implementation, the first profile server may obtain the second profile owner identifier in the profile information from a local memory, or read the second profile owner identifier in the profile information from a storage area of another connected server.

In another implementation, the first profile server may send a first request to the user equipment, where the first request is used to obtain the second profile owner identifier. After receiving the first request, the user equipment sends, to the first profile server, the profile information that carries the second profile owner identifier.

In another implementation, the first profile server may send a second request to a second profile server, where the second request is used to obtain the second profile owner identifier. After obtaining the second profile owner identifier corresponding to the PO, the second profile server sends, to the first profile server, the profile information that carries the second profile owner identifier.

In another implementation, after receiving the remote profile management request sent by the remote profile management server, the first profile server may perform verification or identification by using information such as a message header field and an initiator certificate that are in the message sent by the remote profile management server to the first profile server and that are used to identify an initiator, and a profile owner identifier (PO ID) that is carried in the remote profile management request thereby ensuring identity validity of the remote profile management server.

In another implementation, the first profile server may compare the first profile owner identifier with the second profile owner identifier to verify whether the first profile owner identifier is the same as the second profile owner identifier.

In another implementation, when the first profile owner identifier is different from the second profile owner identifier, the first profile server sends a response message to the remote profile management server, where the response message is used to notify the remote profile management server of a verification error.

In another implementation, the first profile owner identifier and the second profile owner identifier each include at least one of the following: a profile owner identifier that is identifiable to the first profile server, or a profile owner identifier that is identifiable to the second profile server.

In another implementation, when the first profile owner identifier includes only the profile owner identifier that is identifiable to the first profile server, the profile owner identifier that is identifiable to the first profile server in the first profile owner identifier needs to be separately compared with the profile owner identifier that is identifiable to the first profile server in the profile information and the profile owner identifier that is identifiable to the second profile server in the profile information, to verify whether the profile owner identifier that is identifiable to the first profile server in the first profile owner identifier is the same as a profile owner identifier in the profile information. If the profile owner identifier that is identifiable to the first profile server in the first profile owner identifier is the same as a profile owner identifier in the profile information, it is determined that the first profile owner identifier is the same as the second profile owner identifier, or if the profile owner identifier that is identifiable to the first profile server in the first profile owner identifier is different from any profile owner identifier in the profile information, it is determined that the first profile owner identifier is different from the second profile owner identifier. When the first profile owner identifier includes only the profile owner identifier that is identifiable to the second profile server, a verification method is the same as the foregoing method. Details are not described herein again for the sake of brevity. When the first profile owner identifier includes both the profile owner identifier that is identifiable to the first profile server and the profile owner identifier that is identifiable to the second profile server, the profile owner identifier that is identifiable to the first profile server in the first profile owner identifier and the profile owner identifier that is identifiable to the second profile server in the first profile owner identifier need to be respectively compared with the profile owner identifier that is identifiable to the first profile server in the profile information and the profile owner identifier that is identifiable to the second profile server in the profile information. Only when the profile owner identifier that is identifiable to the first profile server in the first profile owner identifier is the same as the profile owner identifier that is identifiable to the first profile server in the profile information and the profile owner identifier that is identifiable to the second profile server in the first profile owner identifier is the same as the profile owner identifier that is identifiable to the second profile server in the profile information, it is determined that the first profile owner identifier is the same as the second profile owner identifier.

In another implementation, the first profile server obtains an identifier correspondence list when the first profile owner identifier is different from the second profile owner identifier, where the identifier correspondence list includes a correspondence between a profile server identifier and a profile owner identifier, determines whether a profile owner identifier corresponding to the first profile owner identifier exists in the identifier correspondence list, and sends the remote profile management command to the user equipment when the profile owner identifier corresponding to the first profile owner identifier exists in the identifier correspondence list, to further verify the PO.

In another implementation, the first profile server obtains the identifier correspondence list from the remote profile management server, obtains the identifier correspondence list from the second profile server, or obtains the identifier correspondence list from the local memory.

In another implementation, the profile owner identifier includes a profile server identifier and a profile owner identifier.

In another implementation, because the first profile owner identifier includes a profile server identifier and a profile owner identifier, the second profile owner identifier that is identifiable to the first profile server in the profile information may be obtained based on an identifier of the first profile server included in the first profile owner identifier. Alternatively, the second profile owner identifier that is identifiable to the second profile server in the profile information is obtained based on an identifier of the second profile server included in the first profile owner identifier.

In another implementation, the first profile server is a server configured to manage a profile, and the second profile server is a server configured to download the profile.

According to a second aspect, an embodiment provides an information verification method, including: receiving, by user equipment, a remote profile management command sent by a first profile server, where the remote profile management command includes a first profile owner identifier; obtaining a second profile owner identifier in profile information; then determining whether the first profile owner identifier is the same as the second profile owner identifier; and finally executing the remote profile management command when the first profile owner identifier is the same as the second profile owner identifier. This prevents a third party from maliciously tampering with profile information that is not possessed by the third party, and avoids a loss caused to an operator or a profile owner due to a user's access to an invalid network or random profile unlocking. In addition, the profile server verifies a PO on a network side. In this way, network security can be improved, a bidirectional authentication process between the profile server and a terminal can be reduced, and a waste of network resources can be reduced.

In an implementation, the user equipment may first search for the second profile owner identifier in the profile information based on an ICCID (profile identifier) carried in the remote profile management command, and compare the first profile owner identifier with the second profile owner identifier to verify whether the first profile owner identifier is the same as the second profile owner identifier.

In another implementation, before receiving the remote profile management command sent by the first profile server, the user equipment receives an update message sent by a remote profile management server or a second profile server, where the update message includes an identifier of the first profile server and a corresponding profile owner identifier.

In another implementation, after receiving the update request sent by the remote profile management server or the second profile server, the user equipment may perform verification or identification may be performed by using information such as a message header field and an initiator certificate that are in the update message and that are used to identify an initiator, and the PO ID that is carried in the update message, thereby ensuring identity validity of the remote profile management server or the second profile server.

In another implementation, the first profile owner identifier includes at least one of the following: a profile owner identifier that is identifiable to the first profile server or a profile owner identifier that is identifiable to the second profile server.

In another implementation, the user equipment obtains an identifier correspondence list when the first profile owner identifier is different from the second profile owner identifier, where the identifier correspondence list includes a correspondence between a profile server identifier and a profile owner identifier, determines whether a profile owner identifier corresponding to the first profile owner identifier exists in the identifier correspondence list, and executes the remote profile management command when the profile owner identifier corresponding to the first profile owner identifier exists in the identifier correspondence list.

In another implementation, before receiving the remote profile management command sent by the first profile server, the user equipment receives a first request sent by the first profile server, where the first request is used to obtain the second profile owner identifier, and sends, to the first profile server, the profile information that carries the second profile owner identifier.

In another implementation, the user equipment may send a response message to the first profile server or the remote profile management server when the first profile owner identifier is different from the second profile owner identifier, where the response message is used to notify the remote profile management server of a verification error.

According to a third aspect, an embodiment provides an information verification method, including: sending, by a remote profile management server, a remote profile management request to a first profile server, where the remote profile management request includes a first profile owner identifier, and the remote profile management request is used to instruct the first profile server to determine whether a second profile owner identifier in profile information is the same as the first profile owner identifier; and sending a remote profile management command to user equipment when the second profile owner identifier is the same as the first profile owner identifier. This prevents a third party from maliciously tampering with profile information that is not possessed by the third party, and avoids a loss caused to an operator or a profile owner due to a user's access to an invalid network or random profile unlocking. In addition, the profile server verifies a PO on a network side. In this way, network security can be improved, a bidirectional authentication process between the profile server and a terminal can be reduced, and a waste of network resources can be reduced.

In an implementation, the remote profile management server determines whether the first profile server configured to manage a profile and a second profile server previously configured to download the profile are a same server, and when the first profile server and the second profile server are different servers, the remote profile management server determines a profile owner identifier that is identifiable to the first profile server or a profile owner identifier that is identifiable to the second profile server.

In another implementation, the remote profile management server may configure information about the first profile server in the profile information in advance, and also configure the profile owner identifier that is identifiable to the first profile server, and after completing the configuration, send an update message to the user equipment, where the update message includes an identifier of the first profile server and a corresponding profile owner identifier.

In another implementation, the first profile owner identifier includes the identifier of the first profile server and a corresponding profile owner identifier that is identifiable to the first profile server, or an identifier of the second profile server and a corresponding profile owner identifier that is identifiable to the second profile server.

According to a fourth aspect, an embodiment provides a first profile server. The first profile server is configured to implement the method and the functions that are performed by the first profile server in the first aspect. The first profile server is implemented by using hardware/software. The hardware/software of the first profile server includes units corresponding to the foregoing functions.

According to a fifth aspect, an embodiment provides user equipment. The user equipment is configured to implement the method and the functions that are performed by the user equipment in the second aspect. The user equipment is implemented by using hardware/software. The hardware/software of the user equipment includes units corresponding to the foregoing functions.

According to a sixth aspect, an embodiment provides a remote profile management server. The remote profile management server is configured to implement the method and the functions that are performed by the remote profile management server in the third aspect. The remote profile management server is implemented by using hardware/software. The hardware/software of the remote profile management server includes units corresponding to the foregoing functions.

According to a seventh aspect, an embodiment provides another first profile server, including a processor, a memory, and a communications bus. The communications bus is configured to implement connection and communication between the processor and the memory, and the processor executes a program stored in the memory, to implement the steps in the information verification method provided in the first aspect.

In an implementation, the profile server provided in an embodiment may include a corresponding module configured to perform behavior of the profile server in the foregoing method. The module may be software and/or hardware.

According to an eighth aspect, an embodiment provides other user equipment, including a processor, a memory, and a communications bus. The communications bus is configured to implement connection and communication between the processor and the memory, and the processor executes a program stored in the memory, to implement the steps in the information verification method provided in the second aspect.

In an implementation, the user equipment provided in an embodiment may include a corresponding module configured to perform behavior of the user equipment in the foregoing method. The module may be software and/or hardware.

According to a ninth aspect, an embodiment provides another remote profile management server, including a processor, a memory, and a communications bus. The communications bus is configured to implement connection and communication between the processor and the memory, and the processor executes a program stored in the memory, to implement the steps in the information verification method provided in the third aspect.

In an implementation, the remote profile management server provided in an embodiment may include a corresponding module configured to perform behavior of the remote profile management server in the foregoing method. The module may be software and/or hardware.

According to a tenth aspect, an embodiment provides a computer-readable storage medium, and the computer-readable storage medium stores an instruction. When the instruction runs on a computer, the computer is enabled to perform the methods in the foregoing aspects.

According to an eleventh aspect, an embodiment provides a computer program product including an instruction. When the computer program product runs on a computer, the computer is enabled to perform the methods in the foregoing aspects.

BRIEF DESCRIPTION OF DRAWINGS

To describe the technical solutions in the embodiments or in the background more clearly, the following briefly describes the accompanying drawings required for describing the embodiments or the background, in which.

DETAILED DESCRIPTION OF EMBODIMENTS

The following describes the embodiments with reference to the accompanying drawings in the embodiments.

Figure 1:
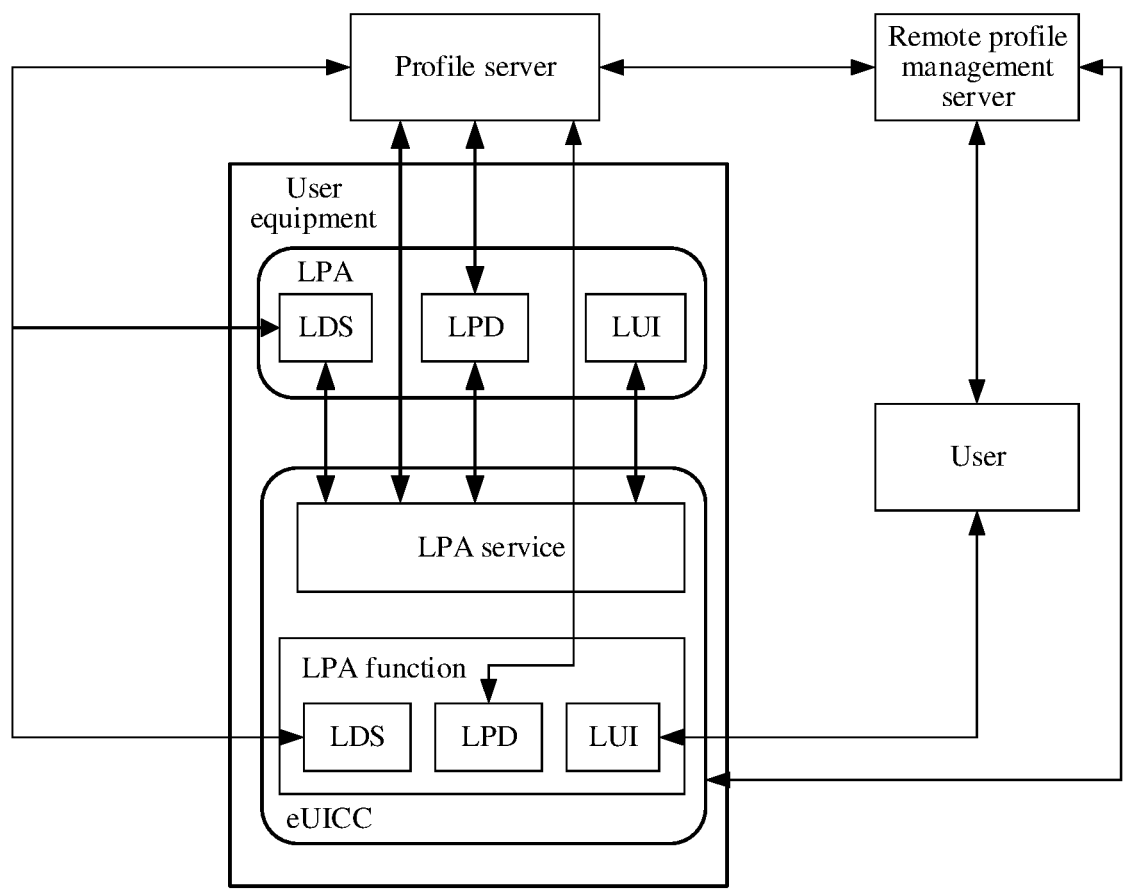
FIG. 1 is a schematic structural diagram of an information verification system according to an embodiment.

FIG. 1 is a schematic structural diagram of an information verification system according to an embodiment. The information verification system includes a profile server, a RPM server, and UE. The profile server may include at least one of a SM DP (or SM-DP+) server and a subscription manager discovery server (SM-DS). The SM DP+ is an enhanced release of an SM DP server, and is collectively referred to as the SM DP+ below. The SM-DP+ is mainly configured to generate, based on basic subscription information (for example, an international mobile subscriber identity) provided by the remote profile management server, a profile that can be downloaded to an eUICC, and the SM-DS is mainly configured to provide one or more SM DP+ addresses for the user equipment. The remote profile management server may be an MNO, an mobile virtual network operator (MVNO) that purchases and uses a profile provided by an MNO, or an enterprise operation and maintenance server that uses a profile provided by an MNO. For example, a company such as BMW Group or State Grid may configure, for a customer or an employee of the company, a profile management service required for connecting a network. The user equipment may include an eUICC and a local profile assistant (LPA) module. The eUICC may be embedded in the user equipment, or may be a pluggable eUICC inserted into the user equipment. Alternatively, the eUICC may be implemented by using an eUICC that is embedded in a chip and that is accessed by using a bus. The LPA module is configured to manage profile downloading, and provide a UI interface (for example, a profile installation list) for the user equipment, so that a user can manage (activate, deactivate, delete, or unlock) a local profile in the eUICC. In addition, the user equipment may further retrieve an EID and/or an ICCID by using the LPA module. The LPA module may be a virtual logic module, or may be an entity module, for example, a field programmable gate array. The LPA includes a local discovery service (LDS), local profile download (LPD), and a local user interface user interface (LUI). The LPA in the user equipment and the LPA in the eUICC may each include one or more of the LDS, the LPD, and the LUI.

Based on the foregoing architecture of the information verification system, a PO may send a remote profile management command to the SM DP+ or a managing SM DP+ to manage a downloaded profile. During management of the downloaded profile, it is possible that the profile is previously downloaded by using an SM DP+, and then the profile in the eUICC is managed by using another SM DP+(for example, Managing SM DP+). If the SM DP+ configured to manage the profile and the SM DP+ configured to download the profile are different servers, an identifier of the managing SM DP+ needs to be first updated to a profile-related parameter, such as profile metadata and profile information (ProfileInfo), and then the managing SM DP+ is permitted to send a remote profile management command.

Figure 2A:
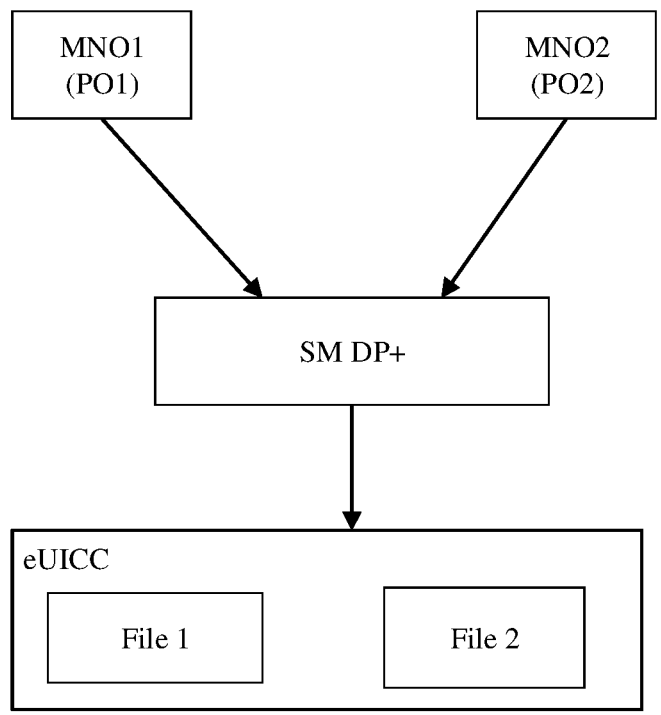
FIG. 2A is a schematic flowchart of an information verification method according to an embodiment.
Figure 2B:
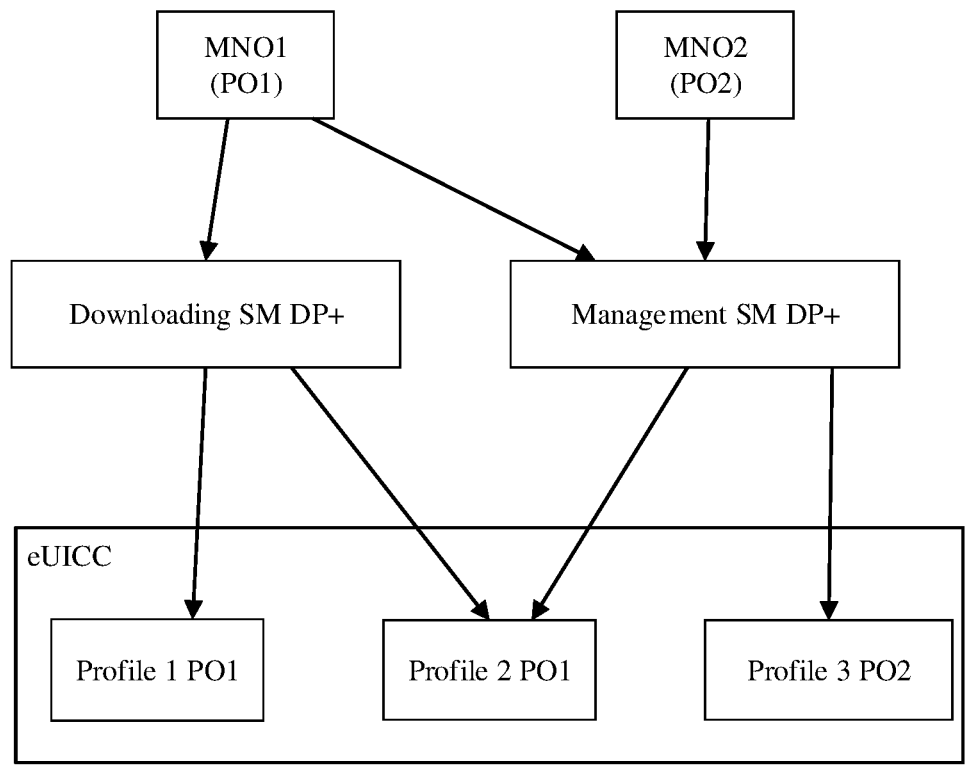
FIG. 2B is a schematic flowchart of another information verification method according to an embodiment.

As shown in FIG. 2A, when an SM DP+ configured to manage a profile and an SM DP+ configured to download the profile are a same server, the SM DP+ and an eUICC authenticate each other, and the SM DP+ and an MNO authenticate each other. Both an MNO1 and an MNO2 have permission to manage the eUICC. However, it is not verified whether the MNO1 and the MNO2 manage profiles in the eUICC, either. As shown in FIG. 2B, when an SM DP+ configured to manage a profile and an SM DP+ configured to download the profile are different servers, the SM DP+ may assign different PO IDs to a same PO; and the SM DP+ may assign a same PO ID to different POs. For example, an SM DP+ of China Mobile in China assigns a PO ID 46001, and an SM DP+ of China Mobile abroad assigns a PO ID CMCC. Alternatively, T-Mobile assigns a PO ID 23430, and EE also assigns the PO ID 23430. In this case, it is not verified whether an MNO1 and an MNO2 manage respective profiles in an eUICC, either. Because a PO is not verified, a third party may maliciously tamper with data in a profile. This affects network security. To resolve the problem, the following solutions are proposed.

Figure 3:
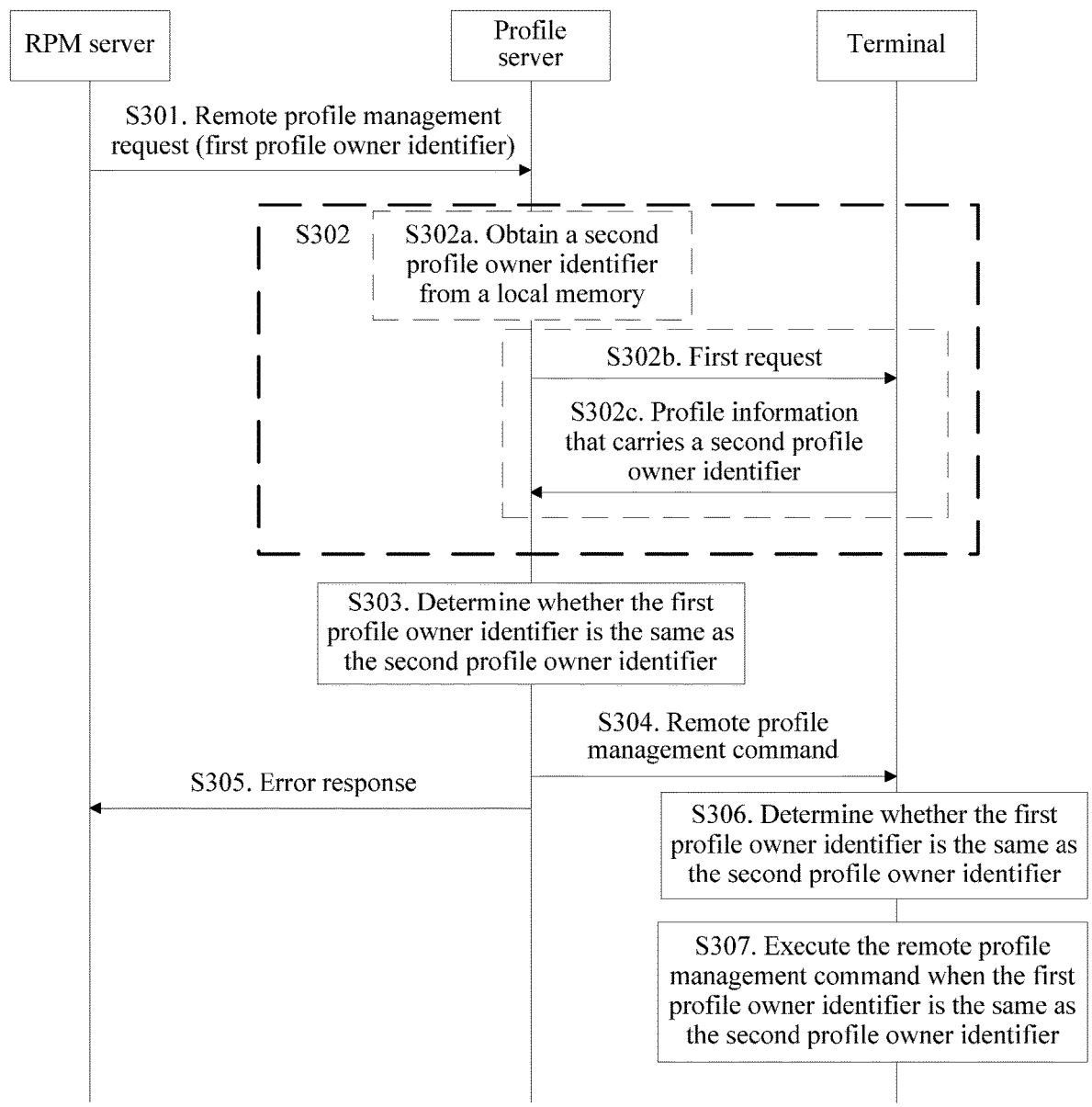
FIG. 3 is a schematic flowchart of an information verification method according to an embodiment.

FIG. 3 is a schematic flowchart of an information verification method according to an embodiment. In this embodiment, a profile server configured to manage a profile and a profile server configured to download the profile are a same server. The method includes but is not limited to the following steps.

S301. A remote profile management server sends a remote profile management (RPM) request to a profile server. The RPM request includes a first PO ID, and the RPM request further includes at least one of an EID, a ICCID, and RPM command-related information.

The first profile owner identifier may include only a profile owner identifier, or may include a profile server identifier and a profile owner identifier. The profile owner identifier may vary with a implementation. For example, an MNO and an SM DP+ may agree on a profile owner identifier in advance, or an MNO and an SM DP+ may use an identifier of a message initiator between the MNO and the SM DP+ as a profile owner identifier. For another example, State Grid, serving as a company, manages a profile purchased by State Grid from the MNO. In this case, the first profile owner identifier may include a PO ID assigned by the MNO or the SM DP+ to State Grid. Alternatively, a MVNO purchases a profile from the MNO. In this case, the first profile owner identifier may include a PO ID assigned to the MVNO. This ensures that State Grid or the MVNO manages the profile of State Grid or the MVNO by using the MNO.

Optionally, after receiving the RPM request sent by the RPM server, the profile server may verify identity validity of the RPM server based on a PO ID carried in the RPM request. In an embodiment, verification or identification may be performed based on at least one type of information such as a message header field and an initiator certificate that are in the message sent by the RPM server to the profile server and that are used to identify an initiator, and the PO ID that is carried in the RPM request. For example, if the PO ID carried in the RPM request is a PO ID of China Mobile, it is verified whether the initiator of the RPM request is China Mobile. If the initiator of the RPM request is not China Mobile, it is verified that an identity of the initiator is invalid. If the initiator of the RPM request is China Mobile, it is verified that the identity of the initiator is valid. This prevents a third party from maliciously using the PO ID of China Mobile to manage the profile. In verification on the identity of the initiator, a verification operation of determining whether the initiator is a valid initiator, a verification operation of judging whether the initiator is a valid initiator, or the like may be performed.

S302. The profile server obtains a second profile owner identifier in profile information. The following two optional manners are included.

The first implementation includes the following step:

S302a. The profile server may obtain the second profile owner identifier in the profile information from a local memory, or read the second profile owner identifier in the profile information from a storage area of another connected server. Further, the second profile owner identifier may be obtained by searching, based on a ICCID carried in the RPM request, for PO ID information stored in profile-related metadata; or a corresponding profile may be searched for based on the ICCID carried in the RPM request, and the second profile owner identifier of the profile is obtained.

The second implementation includes the following steps.

S302b. The profile server may send a first request to user equipment, where the first request is used to obtain the second profile owner identifier, the first request may be a Get ProfileInfo interface command, and the first request may carry at least one of an identifier of a second profile server, an EID, and an ICCID. In an embodiment, after a secure channel is established between the profile server and the user equipment, the profile server may send the first request to the user equipment through an ES 8+ or ES 9+ interface between the profile server and the user equipment.

S302c. After receiving the first request, the user equipment searches for the corresponding profile information based on the ICCID carried in the RPM request, and after finding the corresponding profile information, the user equipment sends, to the profile server, the profile information that carries the second profile owner identifier.

S303. The profile server determines whether the first profile owner identifier is the same as the second profile owner identifier.

In an embodiment, the profile server may compare the first profile owner identifier with the second profile owner identifier to verify or determine whether the first profile owner identifier is the same as the second profile owner identifier.

S304. The profile server sends an RPM command to the user equipment when the first profile owner identifier is the same as the second profile owner identifier, where the RPM command carries the first profile owner identifier, the EID, and the ICCID.

S305. The profile server sends a response message to the remote profile management server when the first profile owner identifier is different from the second profile owner identifier, where the response message is used to notify the RPM server of a verification error.

S306. After receiving the RPM command, the user equipment determines whether the first profile owner identifier is the same as the second profile owner identifier.

In an embodiment, the user equipment may first search for the second profile owner identifier in the profile information based on the ICCID carried in the RPM command, and compare the first profile owner identifier with the second profile owner identifier to verify whether the first profile owner identifier is the same as the second profile owner identifier.

S307. The user equipment executes the RPM command when the first profile owner identifier is the same as the second profile owner identifier. The user equipment may send a response message to the profile server or the RPM server when the first profile owner identifier is different from the second profile owner identifier, where the response message is used to notify the RPM server of a verification error.

In this embodiment, the profile server, serving as both the server configured to download the profile and the server configured to manage the profile, first receives the RPM request sent by the RPM server, and obtains the second profile owner identifier in the profile information, and then determines whether the first profile owner identifier is the same as the second profile owner identifier. The profile server sends the RPM command to the user equipment when the first profile owner identifier is the same as the second profile owner identifier. This not only prevents a third party from maliciously tampering with profile information that is not possessed by the third party, but also avoids a loss caused to an operator or a profile owner due to a user's access to an invalid network or random profile unlocking. In addition, the profile server verifies a PO on a network side. In this way, network security can be improved, a bidirectional authentication process between the profile server and a terminal can be reduced, and a waste of network resources can be reduced.

Figure 4:
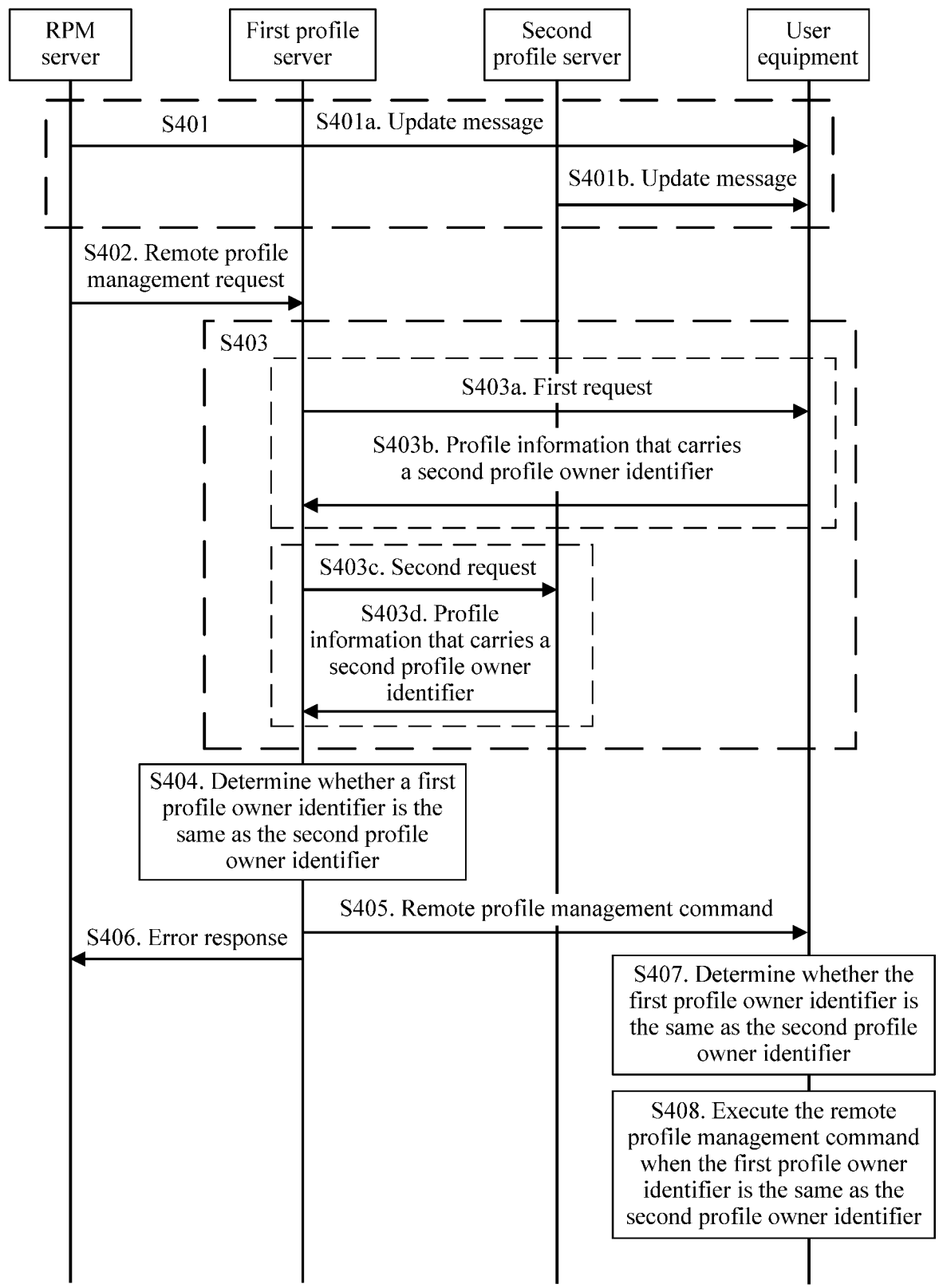
FIG. 4 is a schematic flowchart of an information verification method according to another embodiment.

FIG. 4 is a schematic flowchart of an information verification method according to another embodiment. In this embodiment, a first profile server configured to manage a profile and a second profile server configured to download the profile are different servers. The method includes but is not limited to the following steps.

S401. An RPM server or the second profile server updates profile information to user equipment. This step includes:

S401a. The RPM server sends an update message to the user equipment. S401b. The second profile server sends an update message to the user equipment. The update message includes an identifier of the first profile server, and may further include a corresponding profile owner identifier.

In an embodiment, the RPM server or the second profile server may preconfigure information about the first profile server in the profile information, and preconfigure a profile owner identifier that is identifiable to the first profile server. The information about the first profile server may include the identifier of the first profile server.

After the foregoing information is configured, the user equipment may be assigned to the first profile server for remote profile management. Therefore, the RPM server or the second profile server may send the update message to the user equipment. The second profile server may assign a same identifier or different identifiers as PO IDs of a same profile owner. Therefore, the PO IDs also need to be updated to the profile information. For example, if a PO ID assigned by a first SM DP+ to China Mobile is 46001, and a PO ID assigned by a second SM DP+ to China Mobile is CMCC, an identifier of the first SM DP+ and the corresponding identifier 46001 of China Mobile are stored in the profile information, and an identifier of the second SM DP+ and the corresponding identifier CMCC of China Mobile are also stored in the profile information, to subsequently search for and verify the PO. After receiving the update message, the user equipment updates the identifier of the first profile server and the corresponding profile owner identifier to the profile information. Optionally, the RPM server may further configure the identifier of the first profile server and the corresponding profile owner identifier in the profile information of the user equipment by using an over-the-air (OTA) message.

Optionally, after receiving the update request sent by the RPM server or the second profile server, the user equipment may verify identity validity of the RPM server or the second profile server based on the PO ID carried in the update request. In an embodiment, verification or identification may be performed based on information such as a message header field and an initiator certificate that are in the update message and that are used to identify an initiator, and the PO ID that is carried in the update message. For example, if the PO ID carried in the update request is the PO ID of China Mobile, it is verified whether the initiator of the update request is China Mobile. If the initiator of the update request is not China Mobile, it is verified that an identity of the initiator is invalid. If China Mobile is the initiator of the update request, it is verified that the identity of the initiator is valid. Further, the identifier of the first profile server and the corresponding profile owner identifier are updated to the local profile information. This prevents a third party from maliciously using the PO ID of China Mobile to manage the profile. In verification on the identity of the initiator, a verification operation of determining whether the initiator is a valid initiator, a verification operation of judging whether the initiator is a valid initiator, or the like may be performed.

S402. The RPM server sends an RPM request to the first profile server, where the RPM request includes a first PO ID, and the RPM request further includes at least one of an EID, an ICCID, and RPM command-related information, and the first profile owner identifier includes at least one of the following: a profile owner identifier that is identifiable to the first profile server or a profile owner identifier that is identifiable to the second profile server.

The profile owner identifier may vary with a implementation. For example, an MNO and an SM DP+ may agree on a profile owner identifier in advance, or an MNO and an SM DP+ may use an identifier of a message initiator between the MNO and the SM DP+ as a profile owner identifier. For another example, State Grid, serving as a company, manages a profile purchased by State Grid from the MNO. In this case, the first profile owner identifier may include a PO ID assigned by the MNO or the SM DP+ to State Grid. Alternatively, a MVNO purchases a profile from the MNO. In this case, the first profile owner identifier may include a PO ID assigned to the MVNO. This ensures that State Grid or the MVNO manages the profile of State Grid or the MVNO by using the MNO.

Optionally, after receiving the RPM request initiated by the RPM server, the first profile server may verify identity validity of the RPM server based on the PO ID carried in the RPM request. In an embodiment, verification or identification may be performed based on information such as a message header field and an initiator certificate that are in the message sent by the RPM server to the first profile server and that are used to identify an initiator, and the PO ID that is carried in the RPM request. For example, if the PO ID carried in the RPM request is a PO ID of China Mobile, it is verified whether the initiator of the RPM request is China Mobile. If the initiator of the RPM request is not China Mobile, it is verified that the identity of the initiator is invalid. If the initiator of the RPM request is China Mobile, it is verified that the identity of the initiator is valid. This prevents a third party from maliciously using the PO ID of China Mobile to manage the profile.

S403. The first profile server obtains a second profile owner identifier in profile information, where the second profile owner identifier includes at least one of the following: a profile owner identifier that is identifiable to the first profile server or a profile owner identifier that is identifiable to the second profile server. The following two optional manners are included.

The first implementation includes the following steps:

S403a. The first profile server may send a first request to the user equipment, where the first request is used to obtain the second profile owner identifier, and the first request may be a Get ProfileInfo interface command, and may carry at least one of an identifier of the second profile server, an EID, and an ICCID. In an embodiment, after a secure channel is established between the first profile server and the user equipment, the first profile server may send the first request to the user equipment through an ES 8+ or ES 9+ interface between the first profile server and the user equipment.

S403b. After receiving the first request, the user equipment searches for the corresponding profile information based on the ICCID carried in the RPM request, and after finding the corresponding profile information, the user equipment sends, to the first profile server, the profile information that carries the second profile owner identifier.

The second implementation includes the following steps.

S403c. The first profile server may send a second request to the second profile server, where the second request is used to obtain the second profile owner identifier, and the second request may be a Get ProfileInfo interface command, and may carry at least one of an identifier of the second profile server, an EID, and an ICCID. The identifier of the second profile server is used to perform addressing on the corresponding second profile server, and the EID or the ICCID is used to search for a PO to which the corresponding profile belongs, to obtain the PO ID. For example, the PO may be read from the profile information stored in the second profile server, or the second profile server maintains a plurality of profiles of the RPM server, and searches for, based on the ICCID carried in the second request, a PO to which the corresponding profile belongs, to obtain the PO ID.

S403d. After obtaining the second profile owner identifier corresponding to the PO, the second profile server sends, to the first profile server, the second profile owner identifier or the profile information that carries the second profile owner identifier.

S404. The first profile server determines whether the first profile owner identifier is the same as the second profile owner identifier.

In an embodiment, the first profile server may compare the first profile owner identifier with the second profile owner identifier to verify or determine whether the first profile owner identifier is the same as the second profile owner identifier.

Further, when the first profile owner identifier includes only the profile owner identifier that is identifiable to the first profile server, the profile owner identifier that is identifiable to the first profile server in the first profile owner identifier needs to be separately compared with the profile owner identifier that is identifiable to the first profile server in the profile information and the profile owner identifier that is identifiable to the second profile server in the profile information, to verify whether the profile owner identifier that is identifiable to the first profile server in the first profile owner identifier is the same as a profile owner identifier in the profile information. If the profile owner identifier that is identifiable to the first profile server in the first profile owner identifier is the same as a profile owner identifier in the profile information, it is determined that the first profile owner identifier is the same as the second profile owner identifier. If the profile owner identifier that is identifiable to the first profile server in the first profile owner identifier is different from any profile owner identifier in the profile information, it is determined that the first profile owner identifier is different from the second profile owner identifier. When the first profile owner identifier includes only the profile owner identifier that is identifiable to the second profile server, a verification method is the same as the foregoing method. Details are not described herein again for the sake of brevity. When the first profile owner identifier includes the profile owner identifier that is identifiable to the first profile server and the profile owner identifier that is identifiable to the second profile server, the profile owner identifier that is identifiable to the first profile server in the first profile owner identifier and the profile owner identifier that is identifiable to the second profile server in the first profile owner identifier need to be respectively compared with the profile owner identifier that is identifiable to the first profile server in the profile information and the profile owner identifier that is identifiable to the second profile server in the profile information. Only when the profile owner identifier that is identifiable to the first profile server in the first profile owner identifier is the same as the profile owner identifier that is identifiable to the first profile server in the profile information and the profile owner identifier that is identifiable to the second profile server in the first profile owner identifier is the same as the profile owner identifier that is identifiable to the second profile server in the profile information, it is determined that the first profile owner identifier is the same as the second profile owner identifier.

S405. The first profile server sends an RPM command to the user equipment when the first profile owner identifier is the same as the second profile owner identifier, where the RPM command carries the first profile owner identifier, the EID, and the ICCID.

S406. The first profile server sends a response message to the RPM server when the first profile owner identifier is different from the second profile owner identifier, where the response message is used to notify the RPM server of a verification error.

S407. After receiving the RPM command, the user equipment determines whether the first profile owner identifier is the same as the second profile owner identifier.

In an embodiment, the user equipment may first search for the second profile owner identifier in the profile information based on the ICCID carried in the RPM command, and compare the first profile owner identifier with the second profile owner identifier to verify whether the first profile owner identifier is the same as the second profile owner identifier. A verification method of this embodiment is the same as the verification method of the first profile server in S404. Details are not described herein again for the sake of brevity.

S408. The user equipment executes the RPM command when the first profile owner identifier is the same as the second profile owner identifier; or the user equipment may send a response message to the first profile server or the RPM server when the first profile owner identifier is different from the second profile owner identifier, where the response message is used to notify the RPM server of a verification error.

In this embodiment, when the first profile server configured to manage the profile and the second profile server configured to download the profile are different servers, whether the RPM server that initiates the RPM command specific to the downloaded profile is an owner of the profile is verified; and a PO verification method is provided when different PO IDs are used by the two profile servers to identify a same PO. This not only prevents a third party from maliciously tampering with profile information that is not possessed by the third party, but also avoids a loss caused to an operator or a profile owner due to a user's access to an invalid network or random profile unlocking. In addition, the profile server verifies the PO on a network side. In this way, network security can be improved, a bidirectional authentication process between the profile server and a terminal can be reduced, and a waste of network resources can be reduced.

Figure 5A:
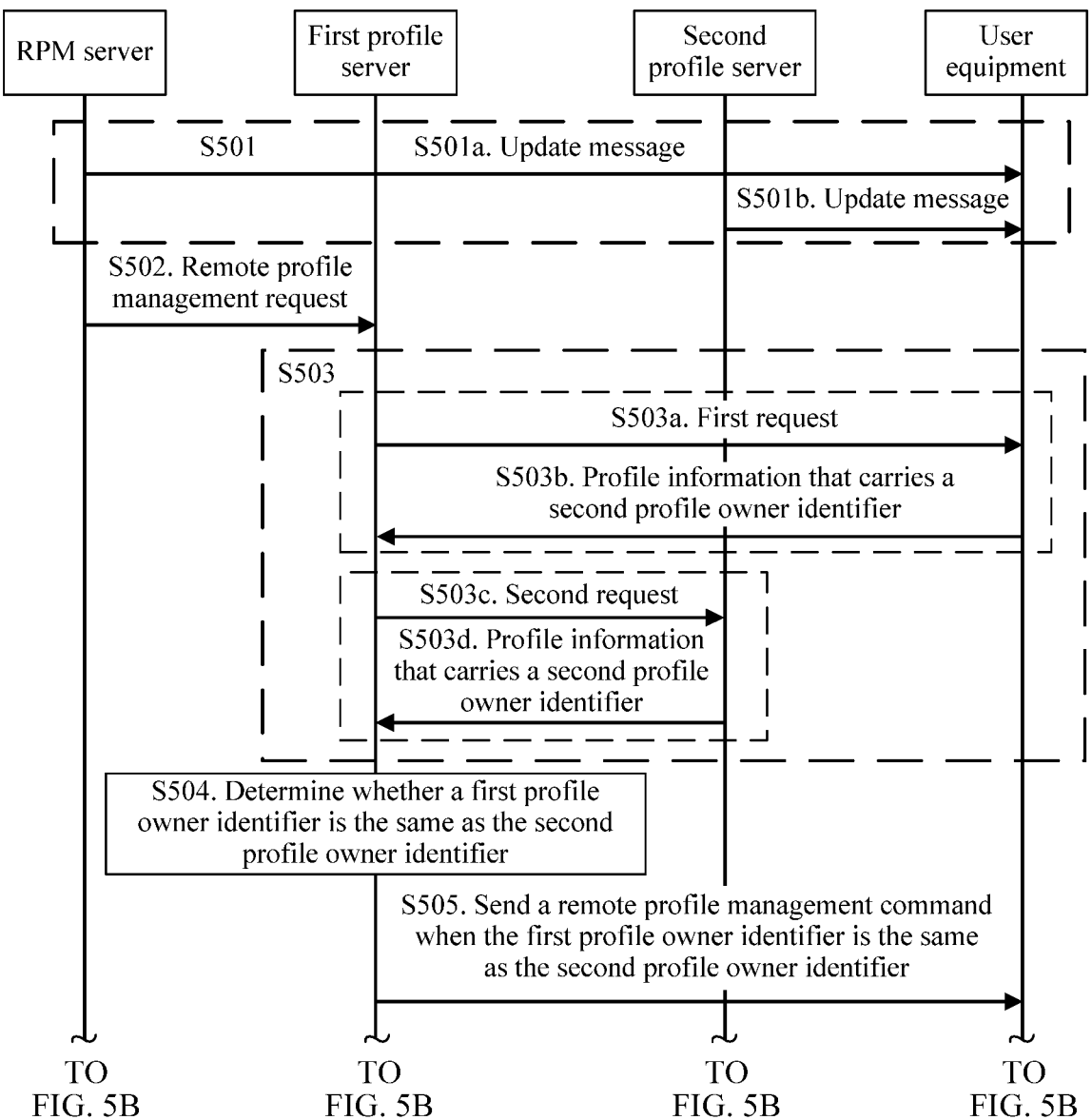
FIG. 5A is a schematic flowchart of an information verification method according to still another embodiment.
Figure 5B:
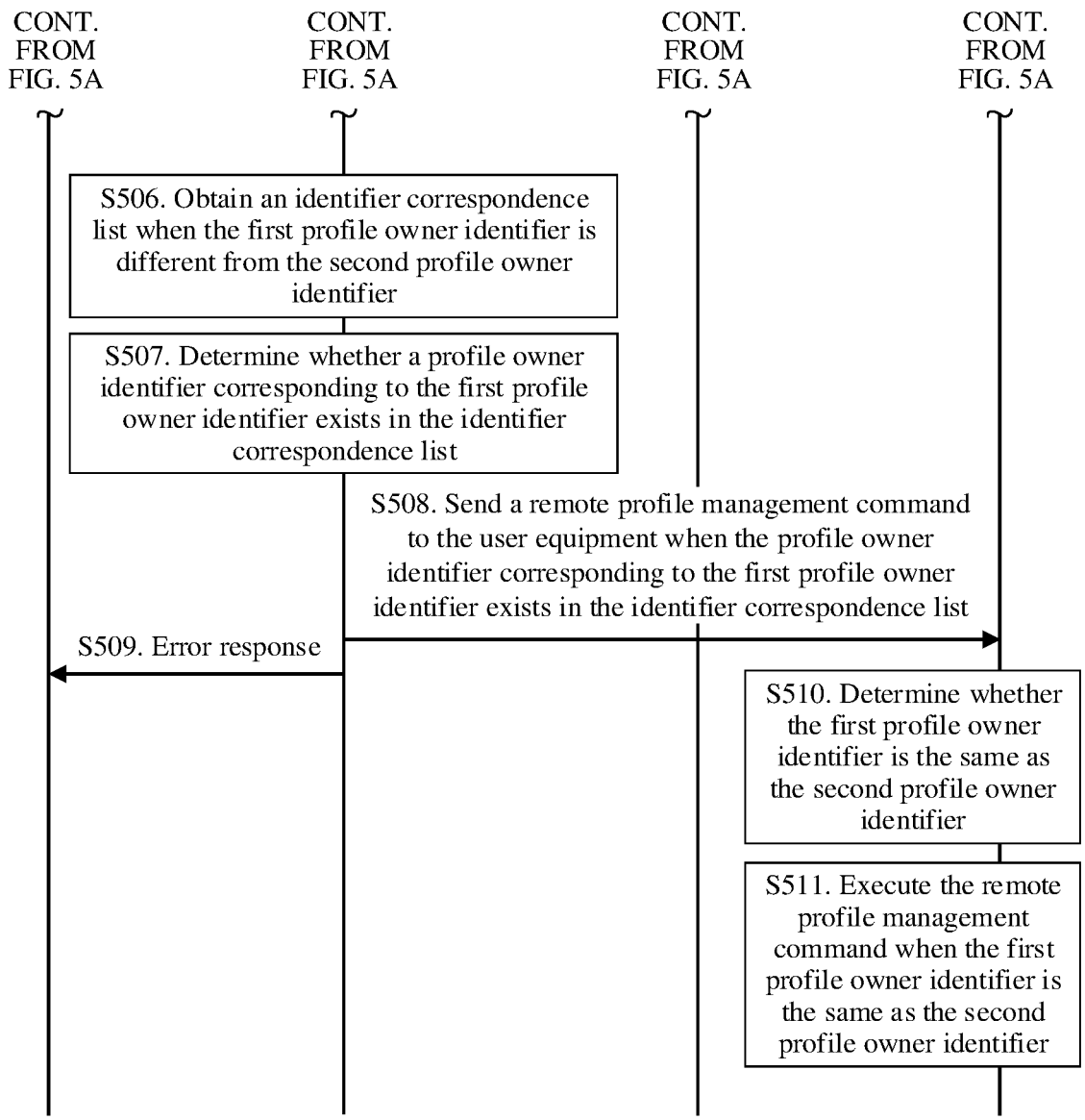
FIG. 5B is a schematic flowchart of an information verification method according to still another embodiment.

FIG. 5A and FIG. 5B are a schematic flowchart of an information verification method according to still another embodiment. In this embodiment, a first profile server configured to manage a profile and a second profile server configured to download the profile are different servers. The method includes but is not limited to the following steps.

S501. An RPM server or the second profile server updates profile information to user equipment. This step includes: S501a. The RPM server sends an update message to the user equipment. S501b. The second profile server sends an update message to the user equipment. The update message includes an identifier of the first profile server, and may further include a corresponding profile owner identifier.

In an embodiment, the RPM server or the second profile server may preconfigure information about the first profile server in the profile information, and preconfigure a profile owner identifier that is identifiable to the first profile server. The information about the first profile server may include the identifier of the first profile server.

After the foregoing information is configured, the user equipment may be assigned to the first profile server for remote profile management. Therefore, the RPM server or the second profile server may send the update message to the user equipment. PO IDs of a same profile owner may be the same or different. Therefore, the PO IDs also need to be updated to the profile information. For example, if a PO ID assigned by a first SM DP+ to China Mobile is 46001, and a PO ID assigned by a second SM DP+ to China Mobile is CMCC, an identifier of the first SM DP+ and the corresponding identifier 46001 of China Mobile are stored in the profile information, and an identifier of the second SM DP+ and the corresponding identifier CMCC of China Mobile are also stored in the profile information, to subsequently search for and verify the PO. After receiving the update message, the user equipment updates the identifier of the first profile server and the corresponding profile owner identifier to the profile information. Optionally, the RPM server may further configure the identifier of the first profile server and the corresponding profile owner identifier in the profile information of the user equipment by using an OTA message.

Optionally, after receiving the update request sent by the RPM server or the second profile server, the user equipment may verify identity validity of the RPM server or the second profile server based on the PO ID carried in the update request. In an embodiment, verification or identification may be performed based on information such as a message header field and an initiator certificate that are in the update message and that are used to identify an initiator, and the PO ID that is carried in the update message. For example, if the PO ID carried in the update request is the PO ID of China Mobile, it is verified whether the initiator of the update request is China Mobile. If the initiator of the update request is not China Mobile, it is verified that an identity of the initiator is invalid. If China Mobile is the initiator of the update request, it is verified that the identity of the initiator is valid. Further, the identifier of the first profile server and the corresponding profile owner identifier are updated to the local profile information. This prevents a third party from maliciously using the PO ID of China Mobile to manage the profile. In verification on the identity of the initiator, a verification operation of determining whether the initiator is a valid initiator, a verification operation of judging whether the initiator is a valid initiator, or the like may be performed.

S502. The RPM server sends an RPM request to the first profile server, where the RPM request includes a first PO ID, and the RPM request further includes at least one of an EID, an ICCID, and RPM command-related information, and the first profile owner identifier includes at least one of the following: a profile owner identifier that is identifiable to the first profile server or a profile owner identifier that is identifiable to the second profile server.

The profile owner identifier may vary with a implementation. For example, an MNO and an SM DP+ may agree on a profile owner identifier in advance, or an MNO and an SM DP+ may use an identifier of a message initiator between the MNO and the SM DP+ as a profile owner identifier. For another example, State Grid, serving as a company, manages a profile purchased by State Grid from the MNO. In this case, the first profile owner identifier may include a PO ID assigned by the MNO or the SM DP+ to State Grid. Alternatively, a mobile virtual network operator purchases a profile from the MNO. In this case, the first profile owner identifier may include a PO ID assigned to the MVNO. This ensures that State Grid or the MVNO manages the profile of State Grid or the MVNO by using the MNO.

Optionally, after receiving the RPM request initiated by the RPM server, the first profile server may verify identity validity of the RPM server based on the PO ID carried in the RPM request. In an embodiment, verification or identification may be performed based on information such as a message header field and an initiator certificate that are in the message sent by the RPM server to the first profile server and that are used to identify an initiator, and the PO ID that is carried in the RPM request. For example, if the PO ID carried in the RPM request is a PO ID of China Mobile, it is verified whether the initiator of the RPM request is China Mobile. If the initiator of the RPM request is not China Mobile, it is verified that the identity of the initiator is invalid. If the initiator of the RPM request is China Mobile, it is verified that the identity of the initiator is valid. This prevents a third party from maliciously using the PO ID of China Mobile to manage the profile. In verification on the identity of the initiator, a verification operation of determining whether the initiator is a valid initiator, a verification operation of judging whether the initiator is a valid initiator, or the like may be performed.

S503. The first profile server obtains a second profile owner identifier in profile information, where the second profile owner identifier includes at least one of the following: a profile owner identifier that is identifiable to the first profile server or a profile owner identifier that is identifiable to the second profile server. The following two optional manners are included.

The first implementation includes the following steps:

S503a. The first profile server may send a first request to the user equipment, where the first request is used to obtain the second profile owner identifier, and the first request may be a Get ProfileInfo interface command, and may carry at least one of an identifier of the second profile server, an EID, and an ICCID. In an embodiment, after a secure channel is established between the first profile server and the user equipment, the first profile server may send the first request to the user equipment through an ES 8+ or ES 9+ interface between the first profile server and the user equipment.

S503b. After receiving the first request, the user equipment searches for the corresponding profile information based on the ICCID carried in the RPM request, and after finding the corresponding profile information, the user equipment sends, to the first profile server, the profile information that carries the second profile owner identifier.

The second implementation includes the following steps.

S503c. The first profile server may send a second request to the second profile server, where the second request is used to obtain the second profile owner identifier, and the second request may be a Get ProfileInfo interface command, and may carry at least one of an identifier of the second profile server, an EID, and an ICCID. The identifier of the second profile server is used to perform addressing on the corresponding second profile server, and the EID or the ICCID is used to search for a PO to which the corresponding profile belongs, to obtain the PO ID. For example, the PO may be read from the profile information stored in the second profile server, or the second profile server maintains a plurality of profiles of the RPM server, and searches for, based on the ICCID carried in the second request, a PO to which the corresponding profile belongs, to obtain the PO ID.

S503d. After obtaining the second profile owner identifier corresponding to the PO, the second profile server sends, to the first profile server, the second profile owner identifier or the profile information that carries the second profile owner identifier.

S504. The first profile server determines whether the first profile owner identifier is the same as the second profile owner identifier.

In an embodiment, the first profile server may compare the first profile owner identifier with the second profile owner identifier to verify or determine whether the first profile owner identifier is the same as the second profile owner identifier.

S505. The first profile server sends an RPM command to the user equipment when the first profile owner identifier is the same as the second profile owner identifier, where the RPM command carries the first profile owner identifier, the EID, and the ICCID.

It can be noted that the first profile owner identifier includes at least one of the following: a profile owner identifier that is identifiable to the first profile server or a profile owner identifier that is identifiable to the second profile server. The second profile owner identifier also includes at least one of the following: a profile owner identifier that is identifiable to the first profile server or a profile owner identifier that is identifiable to the second profile server. Although the profile owner identifier that is identifiable to the first profile server and the profile owner identifier that is identifiable to the second profile server are PO IDs of a same PO, the profile owner identifier that is identifiable to the first profile server and the profile owner identifier that is identifiable to the second profile server may be different. Therefore, the first profile server may verify that the profile owner identifier that is identifiable to the first profile server and the profile owner identifier that is identifiable to the second profile server are different. Further verification needs to be performed in the following manner.

S506. The first profile server obtains an identifier correspondence list when the first profile owner identifier is different from the second profile owner identifier.

In an embodiment, the first profile server may obtain the identifier correspondence list from the RPM server; obtain the identifier correspondence list from the second profile server; or obtain the identifier correspondence list from the local memory. The identifier correspondence list includes a correspondence between a profile server identifier corresponding to a profile owner and a profile owner identifier. For example, if a PO ID assigned by a first SM DP+ to China Mobile is 46001, and a PO ID assigned by a second SM DP+ is CMCC, an identifier of the first SM DP+ and the corresponding identifier 46001 of China Mobile are stored in the identifier correspondence list, and an identifier of the second SM DP+ and the corresponding identifier CMCC of China Mobile are also stored in the identifier correspondence list, to search for and verify the PO.

S507. The first profile server determines whether a profile owner identifier corresponding to the first profile owner identifier exists in the identifier correspondence list.

In an embodiment, the profile owner identifier that is identifiable to the first profile server or the profile owner identifier that is identifiable to the second profile server may be separately compared with a profile owner identifier in the identifier correspondence list, to determine whether the profile owner identifier corresponding to the first profile owner identifier exists in the identifier correspondence list.

S508. The first profile server sends the RPM command to the user equipment when the profile owner identifier corresponding to the first profile owner identifier exists in the identifier correspondence list.

S509. The first profile server sends a response message to the RPM server when the profile owner identifier corresponding to the first profile owner identifier does not exist in the identifier correspondence list, where the response message is used to notify the RPM server of a verification error.

S510. After receiving the RPM command, the user equipment determines whether the first profile owner identifier is the same as the second profile owner identifier.

In an embodiment, the user equipment may first search for the second profile owner identifier in the profile information based on the ICCID carried in the RPM command, and compare the first profile owner identifier with the second profile owner identifier to verify whether the first profile owner identifier is the same as the second profile owner identifier. A verification method of this embodiment is the same as the verification method of the first profile server in S504 to S507. Details are not described herein for the sake of brevity.

S511. The user equipment executes the RPM command when the first profile owner identifier is the same as the second profile owner identifier; or the user equipment may send a response message to the first profile server or the RPM server when the first profile owner identifier is different from the second profile owner identifier, where the response message is used to notify the RPM server of a verification error.

In this embodiment, when the first profile server configured to manage the profile and the second profile server configured to download the profile are different servers, whether the RPM server that initiates the RPM command specific to the downloaded profile is an owner of the profile is verified; and a PO verification method is provided when different PO IDs are used by the two profile servers to identify a same PO. In addition, based on the foregoing embodiment, for the identifier correspondence list maintained by the profile server, when verifying that the first profile owner identifier is different from the second profile owner identifier, the first profile server may further verify, based on the correspondence list, whether the PO IDs belong to a same profile owner. This not only prevents a third party from maliciously tampering with profile information that is not possessed by the third party, but also avoids a loss caused to an operator or a profile owner due to a user's access to an invalid network or random profile unlocking. In addition, the profile server verifies the PO on a network side. In this way, network security can be improved, a bidirectional authentication process between the profile server and a terminal can be reduced, and a waste of network resources can be reduced.

Figure 6:
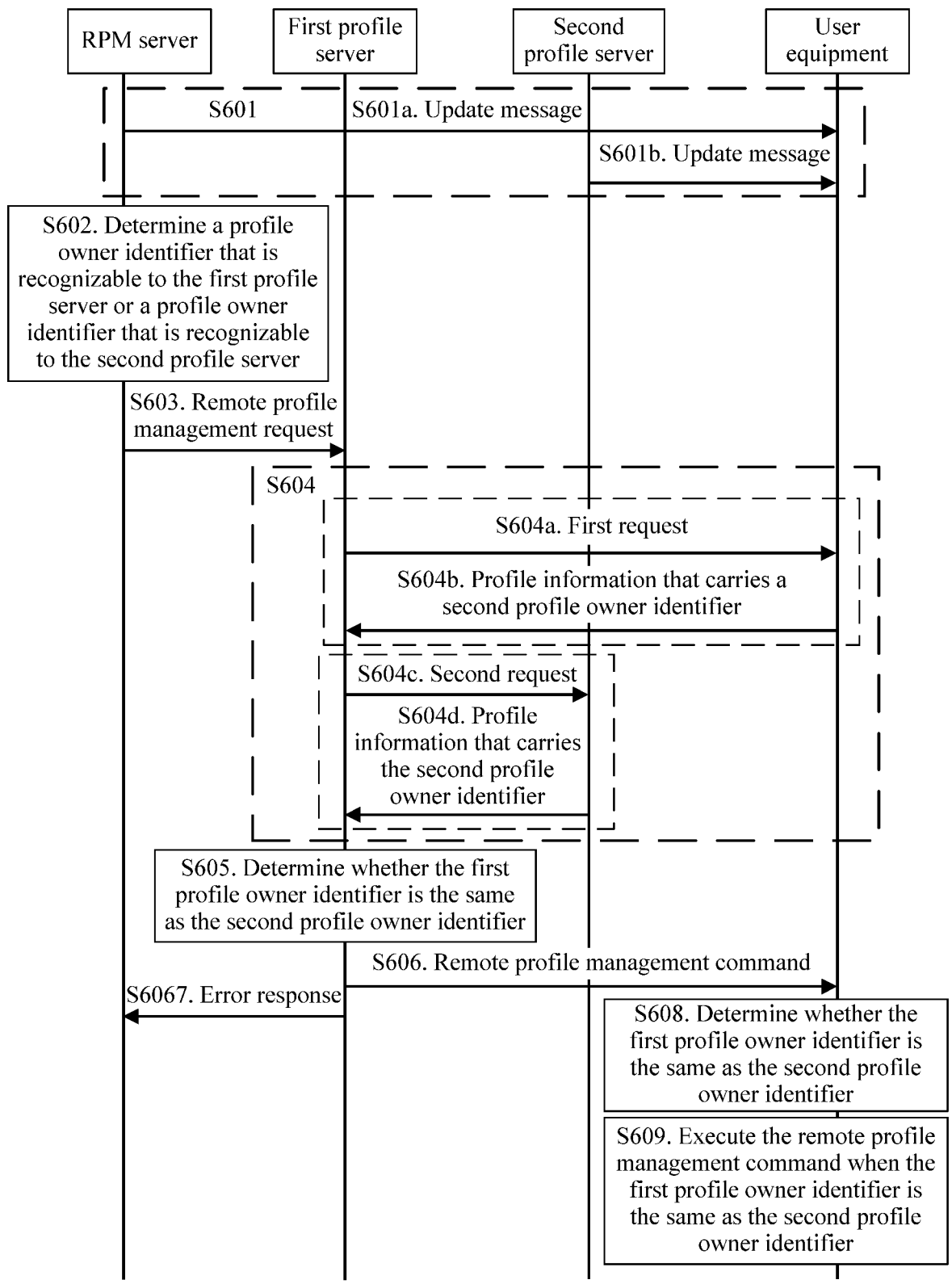
FIG. 6 is a schematic flowchart of an information verification method according to yet another embodiment.

FIG. 6 is a schematic flowchart of an information verification method according to yet another embodiment. In this embodiment, a first profile server configured to manage a profile and a second profile server configured to download the profile are different servers. The method includes but is not limited to the following steps.

S601. An RPM server or the second profile server updates profile information to user equipment. This step includes: S601a. The RPM server sends an update message to the user equipment. S601b. The second profile server sends an update message to the user equipment. The update message includes an identifier of the first profile server, and may further include a corresponding profile owner identifier.

In an embodiment, the RPM server or the second profile server may preconfigure information about the first profile server in the profile information, and preconfigure a profile owner identifier that is identifiable to the first profile server. The information about the first profile server may include the identifier of the first profile server.

After the foregoing information is configured, the user equipment may be assigned to the first profile server for remote profile management. Therefore, the RPM server or the second profile server may send the update message to the user equipment. PO IDs of a same profile owner may be the same or different. Therefore, the PO IDs also need to be updated to the profile information. For example, if a PO ID assigned by a first SM DP+ to China Mobile is 46001, and a PO ID assigned by a second SM DP+ is CMCC, an identifier of the first SM DP+ and the corresponding identifier 46001 of China Mobile are stored in the profile information, and the identifier of the second SM DP+ and the corresponding identifier CMCC of China Mobile are also stored in the profile information, to subsequently search for and verify the PO. After receiving the update message, the user equipment updates the identifier of the first profile server and the corresponding profile owner identifier to the profile information. Optionally, the RPM server may further configure the identifier of the first profile server and the corresponding profile owner identifier in the profile information of the user equipment by using an OTA message.

Optionally, after receiving the update request sent by the RPM server or the second profile server, the user equipment may verify identity validity of the RPM server or the second profile server based on the PO ID carried in the update request. In an embodiment, verification or identification may be performed by using information such as a message header field and an initiator certificate that are in the update message and that are used to identify an initiator, and the PO ID that is carried in the update message. For example, if the PO ID carried in the update request is the PO ID of China Mobile, it is verified whether the initiator of the update request is China Mobile. If the initiator of the update request is not China Mobile, it is verified that an identity of the initiator is invalid. If the initiator of the update request is China Mobile, it is verified that the identity of the initiator is valid. Further, the identifier of the first profile server and the corresponding profile owner identifier are updated to the local profile information. This prevents a third party from maliciously using the PO ID of China Mobile to manage the profile.

S602. The RPM server may determine whether the first profile server configured to manage the profile and the second profile server previously configured to download the profile are a same server. When the first profile server and the second profile server are different servers, the RPM server determines a profile owner identifier that is identifiable to the first profile server or a profile owner identifier that is identifiable to the second profile server. Although the profile owner identifier that is identifiable to the first profile server and the profile owner identifier that is identifiable to the second profile server are PO IDs of a same PO, the profile owner identifier that is identifiable to the first profile server and the profile owner identifier that is identifiable to the second profile server may be different. Therefore, a correspondence between the identifier of the first profile server and the profile owner identifier and a correspondence between the identifier of the second profile server and the profile owner identifier are separately established.

S603. The RPM server sends an RPM request to the first profile server. The RPM request includes a first PO ID, and the RPM request further includes at least one of an EID, an ICCID, or RPM command-related information.

The first profile owner identifier includes at least one of the following: a profile owner identifier that is identifiable to the first profile server or a profile owner identifier that is identifiable to the second profile server. Further, the first profile owner identifier may include a profile server identifier and a profile owner identifier, including the identifier of the first profile server and the corresponding profile owner identifier that is identifiable to the first profile server, or the identifier of the second profile server and the corresponding profile owner identifier that is identifiable to the second profile server.

In addition, the profile owner identifier may vary with a implementation. For example, an MNO and an SM DP+ may agree on a profile owner identifier in advance, or an MNO and an SM DP+ may use an identifier of a message initiator between the MNO and the SM DP+ as a profile owner identifier. For another example, State Grid, serving as a company, manages a profile purchased by State Grid from the MNO. In this case, the first profile owner identifier may include a PO ID assigned by the MNO or the SM DP+ to State Grid. Alternatively, a MVNO purchases a profile from the MNO. In this case, the first profile owner identifier may include a PO ID assigned to the MVNO. This ensures that State Grid or the MVNO manages the profile of State Grid or the MVNO by using the MNO.

Optionally, after receiving the RPM request initiated by the RPM server, the first profile server may verify identity validity of the RPM server based on the PO ID carried in the RPM request. In an embodiment, verification or identification may be performed by using information such as a message header field and an initiator certificate that are in the message sent by the RPM server to the first profile server and that are used to identify an initiator, and the PO ID that is carried in the RPM request. For example, if the PO ID carried in the RPM request is a PO ID of China Mobile, it is verified whether the initiator of the RPM request is China Mobile. If the initiator of the RPM request is not China Mobile, it is verified that an identity of the initiator is invalid. If the initiator of the RPM request is China Mobile, it is verified that the identity of the initiator is valid. This prevents a third party from maliciously using the PO ID of China Mobile to manage the profile. In verification on the identity of the initiator, a verification operation of determining whether the initiator is a valid initiator, a verification operation of judging whether the initiator is a valid initiator, or the like may be performed.

S604. The first profile server obtains a second profile owner identifier in profile information. The second profile owner identifier includes at least one of the following: a profile owner identifier that is identifiable to the first profile server or a profile owner identifier that is identifiable to the second profile server. The following two optional manners are included.

The first implementation includes the following steps:

S604a. The first profile server may send a first request to the user equipment, where the first request is used to obtain the second profile owner identifier, and the first request may be a Get ProfileInfo interface command, and may carry at least one of the identifier of the second profile server, an EID, and an ICCID. In an embodiment, after a secure channel is established between the first profile server and the user equipment, the first profile server may send the first request to the user equipment through an ES 8+ or ES 9+ interface between the first profile server and the user equipment.

S604b. After receiving the first request, the user equipment searches for the corresponding profile information based on the ICCID carried in the RPM request, and after finding the corresponding profile information, the user equipment sends, to the first profile server, the profile information that carries the second profile owner identifier.

The second implementation includes the following steps.

S604c. The first profile server may send a second request to the second profile server, where the second request is used to obtain the second profile owner identifier, and the second request may be a Get ProfileInfo interface command, and may carry at least one of the identifier of the second profile server, an EID, and an ICCID. The identifier of the second profile server is used to perform addressing on the corresponding second profile server, and the EID or the ICCID is used to search for a PO to which the corresponding profile belongs, to obtain the PO ID. For example, the PO may be read from the profile information stored in the second profile server, or the second profile server maintains a plurality of profiles of the RPM server, and searches for, based on the ICCID carried in the second request, a PO to which the corresponding profile belongs, to obtain the PO ID.

S604d. After obtaining the second profile owner identifier corresponding to the PO, the second profile server sends, to the first profile server, the profile information that carries the second profile owner identifier.

In this embodiment, because the first profile owner identifier includes a profile server identifier and a profile owner identifier, the second profile owner identifier that is identifiable to the first profile server in the profile information may be obtained based on the identifier of the first profile server included in the first profile owner identifier. Alternatively, the second profile owner identifier that is identifiable to the second profile server in the profile information is obtained based on the identifier of the second profile server included in the first profile owner identifier.

S605. The first profile server determines whether the first profile owner identifier is the same as the second profile owner identifier.

In an embodiment, the first profile server may compare the first profile owner identifier with the second profile owner identifier to verify or determine whether the first profile owner identifier is the same as the second profile owner identifier.

S606. The first profile server sends an RPM command to the user equipment when the first profile owner identifier is the same as the second profile owner identifier, where the RPM command carries the first profile owner identifier, the EID, and the ICCID.

S607. The first profile server sends a response message to the RPM server when the first profile owner identifier is different from the second profile owner identifier, where the response message is used to notify the RPM server of a verification error.

S608. After receiving the RPM command, the user equipment determines whether the first profile owner identifier is the same as the second profile owner identifier.

In an embodiment, the user equipment may first search for the second profile owner identifier in the profile information based on the ICCID carried in the RPM command, and compare the first profile owner identifier with the second profile owner identifier to verify or determine whether the first profile owner identifier is the same as the second profile owner identifier. A verification method of this embodiment is the same as the verification method of the first profile server in S605. Details are not described herein for the sake of brevity.

S609. The user equipment executes the RPM command when the first profile owner identifier is the same as the second profile owner identifier; or the user equipment may send a response message to the first profile server or the RPM server when the first profile owner identifier is different from the second profile owner identifier, where the response message is used to notify the RPM server of a verification error.

In this embodiment, when the first profile server configured to manage the profile and the second profile server configured to download the profile are different servers, whether the RPM server that initiates the RPM command specific to the downloaded profile is an owner of the profile is verified; and a PO verification method is provided when different PO IDs are used by the two profile servers to identify a same PO. In addition, the RPM server determines the profile owner identifier that is identifiable to the first profile server or the profile owner identifier that is identifiable to the second profile server, so that the first profile server obtains a corresponding profile owner identifier for verification. This not only prevents a third party from maliciously tampering with profile information that is not possessed by the third party, but also avoids a loss caused to an operator or a profile owner due to a user's access to an invalid network or random profile unlocking. In addition, the profile server verifies the PO on a network side. In this way, network security can be improved, a bidirectional authentication process between the profile server and a terminal can be reduced, and a waste of network resources can be reduced.

The foregoing describes in detail the methods in the embodiments. The following provides apparatuses in the embodiments.

Figure 7:
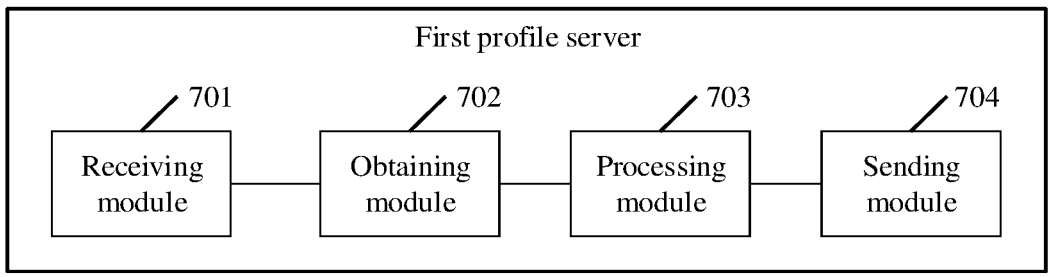
FIG. 7 is a schematic structural diagram of a first profile server according to an embodiment.

FIG. 7 is a schematic structural diagram of a first profile server according to an embodiment. The first profile server may include a receiving module 701, an obtaining module 702, a processing module 703, and a sending module 704. Detailed descriptions of the modules are as follows:

The receiving module 701 is configured to receive an RPM request sent by an RPM server, where the RPM request includes a first profile owner identifier.

The obtaining module 702 is configured to obtain a second profile owner identifier in profile information.

The processing module 703 is configured to determine whether the first profile owner identifier is the same as the second profile owner identifier.

The sending module 704 is configured to send an RPM command to user equipment when the first profile owner identifier is the same as the second profile owner identifier.

Optionally, the obtaining module 702 is configured to obtain the second profile owner identifier in the profile information from a local memory.

Optionally, the obtaining module 702 is configured to: send a first request to the user equipment, where the first request is used to obtain the second profile owner identifier; and receive the profile information that is sent by the user equipment and that carries the second profile owner identifier.

Optionally, the obtaining module 702 is configured to: send a second request to a second profile server, where the second request is used to obtain the second profile owner identifier; and receive the profile information that is sent by the second profile server and that carries the second profile owner identifier.

Optionally, the first profile owner identifier and the second profile owner identifier each include at least one of the following: a profile owner identifier that is identifiable to the first profile server or a profile owner identifier that is identifiable to the second profile server.

Optionally, the obtaining module 702 is further configured to obtain an identifier correspondence list when the first profile owner identifier is different from the second profile owner identifier, where the identifier correspondence list includes a correspondence between a profile server identifier and a profile owner identifier; the processing module 703 is further configured to determine whether a profile owner identifier corresponding to the first profile owner identifier exists in the identifier correspondence list; and the sending module 704 is further configured to send the RPM command to the user equipment when the profile owner identifier corresponding to the first profile owner identifier exists in the identifier correspondence list.

Optionally, the obtaining module 702 is configured to: obtain the identifier correspondence list from the RPM server; obtain the identifier correspondence list from the second profile server; or obtain the identifier correspondence list from the local memory.

Optionally, the first profile server is a server configured to manage a profile, and the second profile server is a server configured to download the profile.

Optionally, the profile owner identifier includes a profile server identifier and a profile owner identifier.

It can be noted that, for implementation of the modules, refer to corresponding descriptions of the method embodiments shown in FIG. 3 to FIG. 6. The modules perform the methods and the functions performed by the first profile server in the foregoing embodiments.

Figure 8:
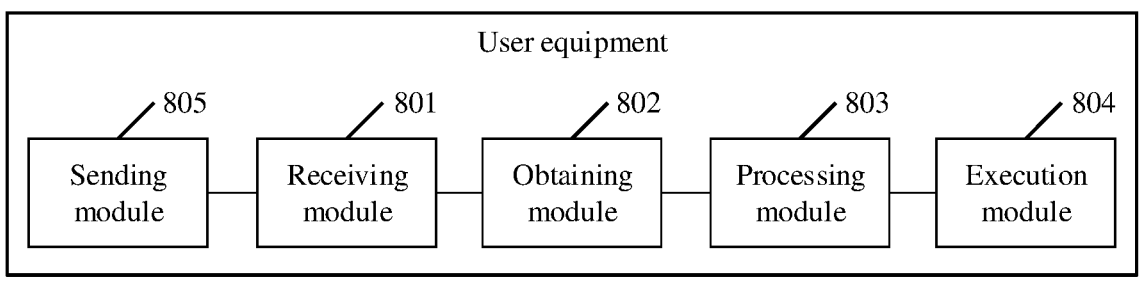
FIG. 8 is a schematic structural diagram of user equipment according to an embodiment.

FIG. 8 is a schematic structural diagram of user equipment according to an embodiment. The user equipment may include a receiving module 801, an obtaining module 802, a processing module 803, and an execution module 804. Detailed descriptions of the modules are as follows:

The receiving module 801 is configured to receive an RPM command sent by a first profile server, where the RPM command includes a first profile owner identifier.

The obtaining module 802 is configured to obtain a second profile owner identifier in profile information.

The processing module 803 is configured to determine whether the first profile owner identifier is the same as the second profile owner identifier.

The execution module 804 is configured to execute the RPM command when the first profile owner identifier is the same as the second profile owner identifier.

Optionally, the receiving module 801 is further configured to receive an update message sent by an RPM server or a second profile server, where the update message includes an identifier of the first profile server and a corresponding profile owner identifier.

Optionally, the first profile owner identifier includes at least one of the following: a profile owner identifier that is identifiable to the first profile server or a profile owner identifier that is identifiable to the second profile server.

Optionally, the obtaining module 802 is further configured to obtain an identifier correspondence list when the first profile owner identifier is different from the second profile owner identifier, where the identifier correspondence list includes a correspondence between a profile server identifier and a profile owner identifier; the processing module 803 is further configured to determine whether a profile owner identifier corresponding to the first profile owner identifier exists in the identifier correspondence list; and the execution module 804 is further configured to execute the RPM command when the profile owner identifier corresponding to the first profile owner identifier exists in the identifier correspondence list.

Optionally, the receiving module 801 is further configured to receive a first request sent by the first profile server, where the first request is used to obtain the second profile owner identifier; and the sending module 805 is configured to send, to the first profile server, the profile information that carries the second profile owner identifier.

It can be noted that, for implementation of the modules, refer to corresponding descriptions of the method embodiments shown in FIG. 3 to FIG. 6. The modules perform the methods and the functions performed by the user equipment in the foregoing embodiments.

Figure 9:
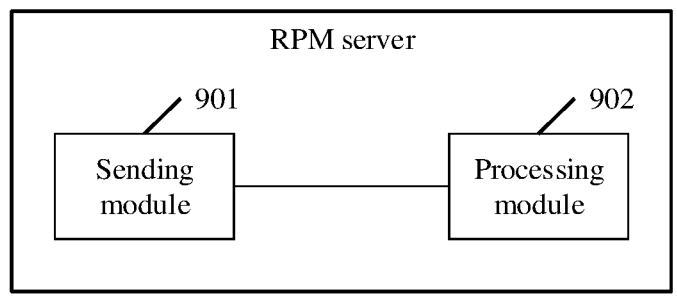
FIG. 9 is a schematic structural diagram of a remote profile management server according to an embodiment.

FIG. 9 is a schematic structural diagram of an RPM server according to an embodiment. The RPM server may include a sending module 901 and a processing module 902. Detailed descriptions of the modules are as follows:

The sending module 901 is configured to send an RPM request to a first profile server, where the RPM request includes a first profile owner identifier, and the RPM request is used to instruct the first profile server to determine whether a second profile owner identifier in profile information is the same as the first profile owner identifier; and send an RPM command to user equipment when the second profile owner identifier is the same as the first profile owner identifier.

Optionally, the processing module 902 is configured to: determine whether the first profile server configured to manage a profile and a second profile server previously configured to download the profile are a same server; and when the first profile server and the second profile server are different servers, determine a profile owner identifier that is identifiable to the first profile server or a profile owner identifier that is identifiable to the second profile server.

It can be noted that, for implementation of the modules, refer to corresponding descriptions of the method embodiments shown in FIG. 3 to FIG. 6. The modules perform the methods and the functions performed by the RPM server in the foregoing embodiments.

Figure 10:
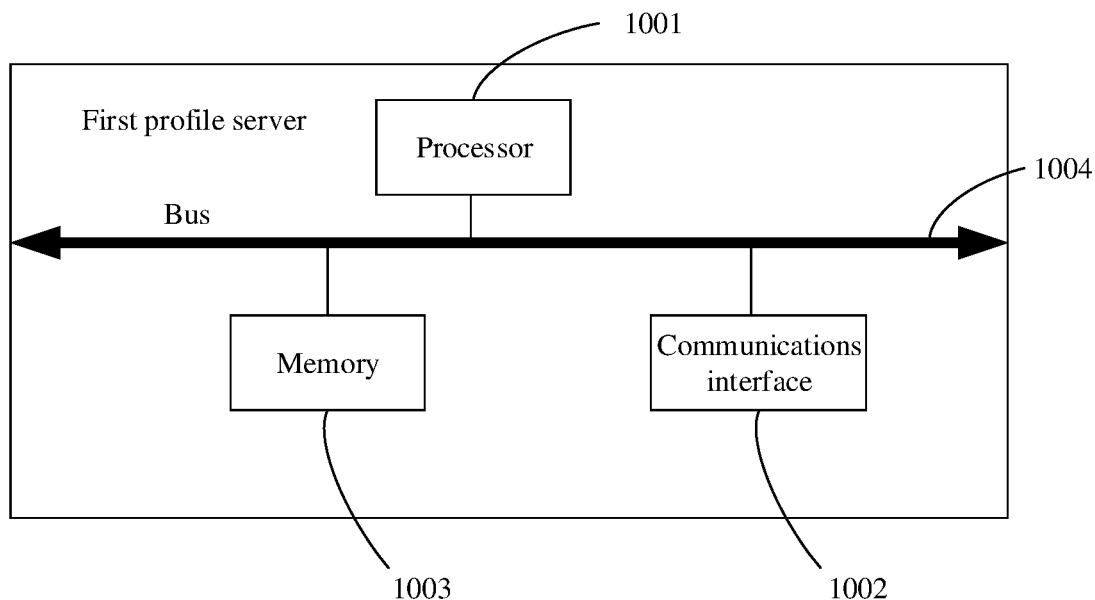
FIG. 10 is a schematic structural diagram of another first profile server according to an embodiment.

FIG. 10 is a schematic structural diagram of another first profile server according to an embodiment. As shown in the figure, the first profile server may include at least one processor 1001, at least one communications interface 1002, at least one memory 1003, and at least one communications bus 1004.

The processor 1001 may be a central processing unit, a general-purpose processor, a digital signal processor, an application-specific integrated circuit, a field programmable gate array or another programmable logical device, a transistor logical device, a hardware component, or any combination thereof. The processor 1001 may implement or execute various example logical blocks, modules, and circuits described with reference to content disclosed in am embodiment. Alternatively, the processor may be a combination of processors implementing a computing function, for example, a combination of one or more microprocessors, or a combination of a digital signal processor and a microprocessor. The communications bus 1004 may be a peripheral component interconnect PCI bus, an extended industry standard architecture EISA bus, or the like. The bus may be classified into an address bus, a data bus, a control bus, or the like. For ease of representation, only one thick line is used to represent the bus in FIG. 10, but this does not mean that there is only one bus or only one type of bus. The communications bus 1004 is configured to implement connection and communication between these components. The communications interface 1002 in the device in this embodiment is configured to perform signaling or data communication with another node device. The memory 1003 may include a volatile memory such as a nonvolatile random access memory (NVRAM), a phase change random access memory (PRAM), or a magnetoresistive random access memory (MRAM), or may include a nonvolatile memory such as at least one magnetic disk storage device, an electrically erasable programmable read-only memory (EEPROM), a flash storage device such as a NOR flash memory (NOR flash memory) or a NAND flash memory, a semiconductor such as a solid state disk (SSD), or the like. Optionally, the memory 1003 may be at least one storage apparatus far away from the processor 1001. The memory 1003 stores a group of program code, and the processor 1001 executes a program in the memory 1003 that is executed by the foregoing first profile server.

An RPM request sent by an RPM server is received by using the communications interface 1002, and the RPM request includes a first profile owner identifier;

a second profile owner identifier in profile information is obtained;

it is determined whether the first profile owner identifier is the same as the second profile owner identifier; and an RPM command is sent by using the communications interface 1002 to user equipment when the first profile owner identifier is the same as the second profile owner identifier.

Optionally, the processor 1001 is further configured to perform the following operation:

obtaining the second profile owner identifier in the profile information from a local memory.

Optionally, the processor 1001 is further configured to perform the following operations:

sending a first request to the user equipment by using the communications interface 1002, where the first request is used to obtain the second profile owner identifier; and receiving, by using the communications interface 1002, the profile information that is sent by the user equipment and that carries the second profile owner identifier.

Optionally, the processor 1001 is further configured to perform the following operations:

sending a second request to a second profile server by using the communications interface 1002, where the second request is used to obtain the second profile owner identifier; and receiving, by using the communications interface 1002, the profile information that is sent by the second profile server and that carries the second profile owner identifier.

The first profile owner identifier and the second profile owner identifier each include at least one of the following: a profile owner identifier that is identifiable to the first profile server or a profile owner identifier that is identifiable to the second profile server.

Optionally, the processor 1001 is further configured to perform the following operations:

obtaining an identifier correspondence list when the first profile owner identifier is different from the second profile owner identifier, where the identifier correspondence list includes a correspondence between a profile server identifier and a profile owner identifier;

determining whether a profile owner identifier corresponding to the first profile owner identifier exists in the identifier correspondence list; and when a profile owner identifier corresponding to the first profile owner identifier exists in the identifier correspondence list, sending the RPM command to the user equipment by using the communications interface 1002.

Optionally, the processor 1001 is further configured to perform the following operations:

obtaining the identifier correspondence list from the RPM server;

obtaining the identifier correspondence list from the second profile server; or obtaining the identifier correspondence list from the local memory.

The first profile server is a server configured to manage a profile, and the second profile server is a server configured to download the profile.

The profile owner identifier includes a profile server identifier and a profile owner identifier.

Further, the processor may further cooperate with the memory and the communications interface to perform the operations of the first profile server in the foregoing embodiments.

Figure 11:
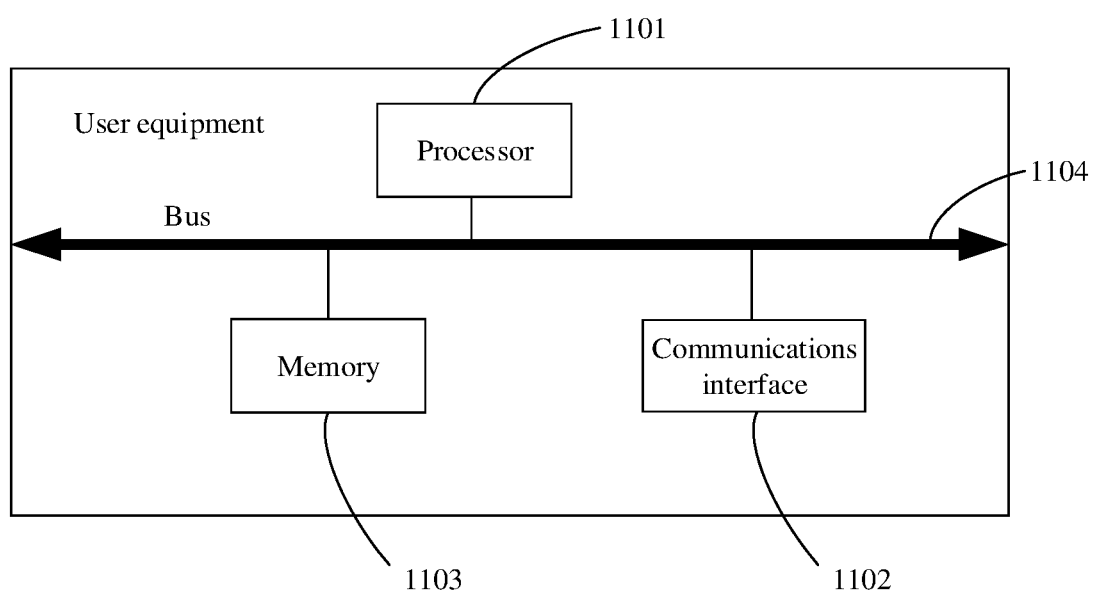
FIG. 11 is a schematic structural diagram of other user equipment according to an embodiment.

FIG. 11 is a schematic structural diagram of other user equipment according to an embodiment. As shown in the figure, the user equipment may include at least one processor 1101, at least one communications interface 1102, at least one memory 1103, and at least one communications bus 1104.

The processor 1101 may be the various types of processors mentioned above. The communications bus 1104 may be a peripheral component interconnect PCI bus, an extended industry standard architecture EISA bus, or the like. The bus may be classified into an address bus, a data bus, a control bus, or the like. For ease of representation, only one thick line is used to represent the bus in FIG. 11, but this does not mean that there is only one bus or only one type of bus. The communications bus 1104 is configured to implement connection and communication between these components. The communications interface 1102 in the device in this embodiment is configured to perform signaling or data communication with another node device. The memory 1103 may be the various types of memories mentioned above. Optionally, the memory 1103 may be at least one storage apparatus far away from the processor 1101. The memory 1103 stores a group of program code, and the processor 1101 executes a program in the memory 1103 that is executed by the foregoing user equipment.

An RPM command sent by a first profile server is received by using the communications interface 1102, where the RPM command includes a first profile owner identifier;

a second profile owner identifier in profile information is obtained;

it is determined whether the first profile owner identifier is the same as the second profile owner identifier; and the RPM command is executed when the first profile owner identifier is the same as the second profile owner identifier.

Optionally, the processor 1101 is further configured to perform the following operation:

receiving, by using the communications interface 1102, an update message sent by an RPM server or a second profile server, where the update message includes an identifier of the first profile server and a corresponding profile owner identifier.

The first profile owner identifier includes at least one of the following: a profile owner identifier that is identifiable to the first profile server or a profile owner identifier that is identifiable to the second profile server.

Optionally, the processor 1101 is further configured to perform the following operation:

obtaining an identifier correspondence list when the first profile owner identifier is different from the second profile owner identifier, where the identifier correspondence list includes a correspondence between a profile server identifier and a profile owner identifier;

determining whether a profile owner identifier corresponding to the first profile owner identifier exists in the identifier correspondence list; and executing the RPM command when the profile owner identifier corresponding to the first profile owner identifier exists in the identifier correspondence list.

Optionally, the processor 1101 is further configured to perform the following operations:

receiving, by using the communications interface 1102, a first request sent by the first profile server, where the first request is used to obtain the second profile owner identifier; and sending, to the first profile server by using the communications interface 1102, the profile information that carries the second profile owner identifier.

Further, the processor may further cooperate with the memory and the communications interface to perform the operations of the user equipment in the foregoing embodiments.

Figure 12:
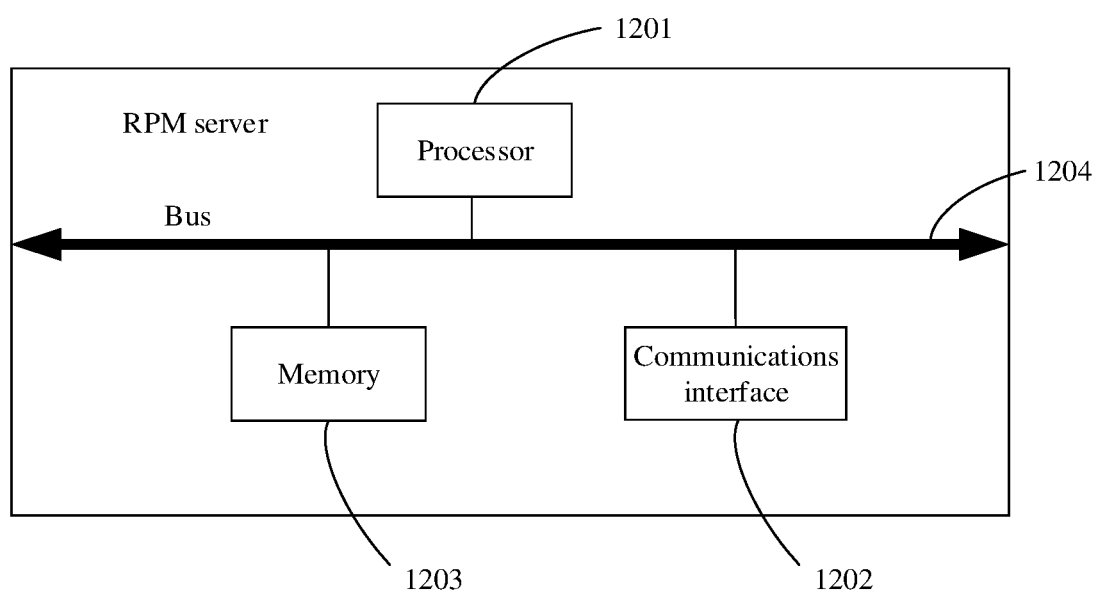
FIG. 12 is a schematic structural diagram of another remote profile management server according to an embodiment.

FIG. 12 is a schematic structural diagram of another RPM server according to an embodiment. As shown in the figure, the RPM server may include at least one processor 1201, at least one communications interface 1202, at least one memory 1203, and at least one communications bus 1204.

The processor 1201 may be the various types of processors mentioned above. The communications bus 1204 may be a peripheral component interconnect PCI bus, an extended industry standard architecture EISA bus, or the like. The bus may be classified into an address bus, a data bus, a control bus, or the like. For ease of representation, only one thick line is used to represent the bus in FIG. 12, but this does not mean that there is only one bus or only one type of bus. The communications bus 1204 is configured to implement connection and communication between these components. The communications interface 1202 in the device in this embodiment is configured to perform signaling or data communication with another node device. The memory 1203 may be the various types of memories mentioned above. Optionally, the memory 1203 may be at least one storage apparatus far away from the processor 1201. The memory 1203 stores a group of program code, and the processor 1201 executes a program in the memory 1203 that is executed by the foregoing RPM server.

An RPM request is sent to a first profile server by using the communications interface 1202, where the RPM request includes a first profile owner identifier, and the RPM request is used to instruct the first profile server to determine whether a second profile owner identifier in profile information is the same as the first profile owner identifier; and an RPM command is sent to user equipment when the second profile owner identifier is the same as the first profile owner identifier.

Optionally, the processor 1201 is further configured to perform the following operations:

determining whether the first profile server configured to manage a profile and a second profile server previously configured to download the profile are a same server; and when the first profile server and the second profile server are different servers, determining a profile owner identifier that is identifiable to the first profile server or a profile owner identifier that is identifiable to the second profile server.

Further, the processor may further cooperate with the memory and the communications interface to perform the operations of the RPM server in the foregoing embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

The objectives, technical solutions, and beneficial effects of the invention have been described in more detail with reference to the foregoing embodiments. Any modification, equivalent replacement, or improvement made without departing from the spirit and principle of the invention shall fall within the protection scope of the invention.

The invention claimed is:

1. An information verification method comprising:
receiving, by a first profile server, a remote profile management request sent by a remote profile management server, wherein the remote profile management request comprises a first profile owner identifier;
after receiving the first profile owner identifier, requesting, from an external device, a second profile owner identifier, and obtaining, by the first profile server, from the external device, the second profile owner identifier in profile information, and storing the second profile owner identifier on the first profile server upon obtaining the second profile owner identifier from the external device;
after identifying and obtaining the second profile owner identifier, determining, by the first profile server, whether the first profile owner identifier matches the second profile owner identifier; and
sending, by the first profile server, a remote profile management command to a user equipment when the first profile owner identifier matches the second profile owner identifier.

2. The method according to claim 1, wherein the obtaining, by the first profile server, of the second profile owner identifier in the profile information further comprises:
obtaining, by the first profile server, the second profile owner identifier in the profile information from a local memory.

3. The method according to claim 1, wherein the obtaining, by the first profile server, of the second profile owner identifier in the profile information further comprises:
sending, by the first profile server, a first request to the user equipment, wherein the first request is used to obtain the second profile owner identifier; and
receiving, by the first profile server, the profile information that is sent by the user equipment, and the profile information carries the second profile owner identifier.

4. The method according to claim 1, wherein the obtaining, by the first profile server, of the second profile owner identifier in the profile information further comprises:
sending, by the first profile server, a second request to a second profile server, wherein the second request is used to obtain the second profile owner identifier; and receiving, by the first profile server, the profile information that is sent by the second profile server, and the profile information carries the second profile owner identifier.

5. The method according to claim 1, wherein each of the first profile owner identifier and the second profile owner identifier comprise at least one of:
 a profile owner identifier that is identifiable to the first profile server; and
 the profile owner identifier that is identifiable to a second profile server.

6. The method according to claim 5, further comprising:
 obtaining, by the first profile server, an identifier correspondence list when the first profile owner identifier is different from the second profile owner identifier, wherein the identifier correspondence list comprises a correspondence between a profile server identifier and the profile owner identifier;
 determining, by the first profile server, whether the profile owner identifier corresponding to the first profile owner identifier exists in the identifier correspondence list; and
 sending, by the first profile server, the remote profile management command to the user equipment when the profile owner identifier corresponding to the first profile owner identifier exists in the identifier correspondence list.

7. The method according to claim 6, wherein the obtaining, by the first profile server, of the identifier correspondence list further comprises:
 obtaining, by the first profile server, the identifier correspondence list from the remote profile management server, the second profile server, or the local memory.

8. The method according to claim 1, wherein the first profile server manages a profile, and a second profile server downloads the profile.

9. The method according to claim 1, wherein each of the first profile owner identifier and the second profile owner identifier comprises a profile server identifier and a profile owner identifier.

10. An information verification method comprising:
 receiving, by a user equipment, an update message sent by a remote profile management server or a second profile server, wherein the update message comprises an identifier of a first profile server and a corresponding profile owner identifier, wherein said corresponding profile owner identifier is the first profile owner identifier;
 after receiving the update message, receiving, by the user equipment, a remote profile management command sent by the first profile server, wherein the remote profile management command comprises the first profile owner identifier;
 obtaining, by the user equipment, a second profile owner identifier in profile information;
 determining, by the user equipment, whether the first profile owner identifier matches the second profile owner identifier; and
 executing, by the user equipment, the remote profile management command when the first profile owner identifier matches the second profile owner identifier.

11. The method according to claim 10, wherein the first profile owner identifier comprises at least one of:
 a profile owner identifier that is identifiable to the first profile server; and
 the profile owner identifier that is identifiable to a second profile server.

12. The method according to claim 10, further comprising:
 obtaining, by the user equipment, an identifier correspondence list when the first profile owner identifier is different from the second profile owner identifier, wherein the identifier correspondence list comprises a correspondence between a profile server identifier and a profile owner identifier;
 determining, by the user equipment, whether the profile owner identifier corresponding to the first profile owner identifier exists in the identifier correspondence list; and
 executing, by the user equipment, the remote profile management command when the profile owner identifier corresponding to the first profile owner identifier exists in the identifier correspondence list.

13. The method according to claim 10, before the receiving, by the user equipment, the remote profile management command sent by the first profile server, further comprising:
 receiving, by the user equipment, a first request sent by the first profile server, wherein the first request is used to obtain the second profile owner identifier; and
 sending, by the user equipment to the first profile server, the profile information that carries the second profile owner identifier.

14. A first profile server, comprising a memory, a communications bus, and a processor, wherein the memory is configured to store program code that, when executed by the processor, causes the first profile server to perform:
 receiving a remote profile management request sent by a remote profile management server, wherein the remote profile management request comprises a first profile owner identifier;
 after receiving the first profile owner identifier, requesting, from an external device, a second profile owner identifier, and obtaining, from the external device, the second profile owner identifier in profile information, and storing the second profile owner identifier on the first profile server upon obtaining the second profile owner identifier from the external device;
 after identifying and obtaining the second profile owner identifier, determining whether the first profile owner identifier matches the second profile owner identifier; and
 sending a remote profile management command to a user equipment when the first profile owner identifier matches the second profile owner identifier.

15. The first profile server according to claim 14, wherein the obtaining of the second profile owner identifier in the profile information comprises:
 obtaining the second profile owner identifier in the profile information from a local memory.

16. The first profile server according to claim 14, wherein the obtaining of the second profile owner identifier in the profile information comprises:
 sending a first request to the user equipment, wherein the first request is used to obtain the second profile owner identifier; and
 receiving the profile information that is sent by the user equipment, and the profile information carries the second profile owner identifier.

17. The first profile server according to claim 14, wherein the obtaining of the second profile owner identifier in the profile information comprises:
 sending a second request to a second profile server, wherein the second request is used to obtain the second profile owner identifier; and receiving, by the first profile server, the profile information that is sent by the second profile server, and the profile information carries the second profile owner identifier.

18. The first profile server according to claim 14, wherein each of the first profile owner identifier and the second profile owner identifier comprises at least one of:
   a profile owner identifier that is identifiable to the first profile server; and
   the profile owner identifier that is identifiable to a second profile server.

19. The first profile server according to claim 18, wherein the memory configured to the store program code, when executed by the processor, causes the first profile server to further perform:
   obtaining an identifier correspondence list when the first profile owner identifier is different from the second profile owner identifier, wherein the identifier correspondence list comprises a correspondence between a profile server identifier and the profile owner identifier;
   determining whether the profile owner identifier corresponding to the first profile owner identifier exists in the identifier correspondence list; and
   sending the remote profile management command to the user equipment when the profile owner identifier corresponding to the first profile owner identifier exists in the identifier correspondence list.

\* \* \* \* \*